United States Patent
Wu et al.

(10) Patent No.: US 12,437,091 B2
(45) Date of Patent: Oct. 7, 2025

(54) SECURE-FRAGMENT-CONVERSION METHODS AND APPARATUSES FOR PROTECTING PRIVACY DATA

(71) Applicant: ALIPAY (HANGZHOU) INFORMATION TECHNOLOGY CO., LTD., Zhejiang (CN)

(72) Inventors: Haoqi Wu, Hangzhou (CN); Weili Han, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 110 days.

(21) Appl. No.: 18/391,144

(22) Filed: Dec. 20, 2023

(65) Prior Publication Data

US 2024/0220645 A1 Jul. 4, 2024

(30) Foreign Application Priority Data

Dec. 30, 2022 (CN) .......................... 202211733481.8

(51) Int. Cl.
*G06F 21/62* (2013.01)

(52) U.S. Cl.
CPC ...... *G06F 21/6209* (2013.01); *G06F 21/6245* (2013.01)

(58) Field of Classification Search
CPC .................. G06F 21/6209; G06F 21/6245
USPC .................................................... 26/26
See application file for complete search history.

(56) References Cited

U.S. PATENT DOCUMENTS

| | | | | |
|---|---|---|---|---|
| 10,397,272 | B1* | 8/2019 | Bruss | G06N 7/01 |
| 10,833,871 | B2* | 11/2020 | Ranellucci | H04L 9/3255 |
| 11,329,808 | B2* | 5/2022 | Ikarashi | H04L 9/32 |
| 11,394,698 | B2* | 7/2022 | Lev | H04L 9/085 |
| 11,544,571 | B2* | 1/2023 | Zhong | G06N 3/047 |
| 11,689,371 | B2* | 6/2023 | Yadlin | H04L 9/3247 713/168 |
| 11,847,395 | B2* | 12/2023 | Raumann | G06F 9/5005 |
| 12,002,157 | B2* | 6/2024 | Beltrand | G06N 3/0455 |
| 2020/0053111 | A1* | 2/2020 | Jakobsson | H04L 63/1416 |
| 2020/0204572 | A1* | 6/2020 | Jeyakumar | G06F 21/561 |
| 2023/0299942 | A1* | 9/2023 | Be'Ery | H04L 9/3255 713/171 |
| 2024/0039697 | A1* | 2/2024 | Wu | H04L 9/008 |

(Continued)

FOREIGN PATENT DOCUMENTS

CN 116055049 5/2023

*Primary Examiner* — Taghi T Arani
(74) *Attorney, Agent, or Firm* — Fish & Richardson P.C.

(57) ABSTRACT

In an implementation, a first party or a third party updates, by adding an offset to the first fragment, two local fragments held by the local party, where the offset enables offset data obtained by performing addition on updated fragments of each party to be greater than or equal to 0. Multi-party joint computation is performed by using the two updated local fragments together with fragments held by the other two parties to obtain two overflow fragments of an overflow bit and in a second ring for performing a modulo operation on a second value of an n power of 2, m is less than n; and the overflow bit indicates whether the offset data is greater than or equal to the first value. Two converted fragments are obtained in the second ring based on the two updated local fragments, the two overflow fragments, and the offset.

20 Claims, 6 Drawing Sheets

(56) References Cited

U.S. PATENT DOCUMENTS

2024/0304200 A1* 9/2024 Keshet ................... G06N 3/09
2024/0372731 A1* 11/2024 Kobel .................. H04L 9/3239

* cited by examiner

Perform multi-party joint computation by using two fragments held by a local party and updated fragments of the other two parties to obtain two overflow fragments of an overflow bit and in a second ring for performing a modulo operation on a second value, where the second value is 2 to the power of n, and m is less than n; the updated fragments of the other two parties are obtained by adding an offset to a first fragment, and the offset enables offset data obtained by performing addition on updated fragments of each party to be greater than or equal to 0; and the overflow bit indicates whether the offset data are greater than or equal to a first value ⎯31

Obtain two converted fragments in the second ring based on the two local fragments and the two overflow fragments ⎯32

FIG. 3

Update, by adding an offset to a first fragment, two local fragments held by a local party, where the offset enables offset data obtained by performing addition on updated fragments of each party to be greater than or equal to 0 — 41

Obtain two groups of random fragments of a random number that correspond to the local party and two significant-bit fragments of a most significant bit of the random number and in a second ring for performing a modulo operation on a second value, where the second value is 2 to the power of n, and m is less than n — 42

Perform multi-party joint computation with the other two parties by using the two updated local fragments, the two groups of random fragments, and the two significant-bit fragments to obtain two overflow fragments of an overflow bit and in the second ring, where the overflow bit is used to indicate whether a sum of the offset data and the random number is greater than or equal to a first value — 43

Obtain two converted fragments in the second ring based on the two overflow fragments, the two groups of random fragments, and the offset — 44

FIG. 4

Obtain two groups of random fragments of a random number that correspond to a local party and two significant-bit fragments of a most significant bit of the random number and in a second ring for performing a modulo operation on a second value, where the second value is 2 to the power of n, and m is less than n ——51

Perform multi-party joint computation by using two fragments held by the local party, the two groups of random fragments, the two significant-bit fragments, and updated fragments of the other two parties to obtain two overflow fragments of an overflow bit and in the second ring, where the updated fragments of the other two parties are obtained by adding an offset to a first fragment, and the offset enables offset data obtained by performing addition on updated fragments of each party to be greater than or equal to 0; and the overflow bit is used to indicate whether a sum of the offset data and the random number is greater than or equal to the first value ——52

Obtain two converted fragments in the second ring based on the two overflow fragments and the two groups of random fragments ——53

FIG. 5

SECURE-FRAGMENT-CONVERSION METHODS AND APPARATUSES FOR PROTECTING PRIVACY DATA

CROSS-REFERENCE TO RELATED APPLICATIONS

This application claims priority to Chinese Patent Application No. 202211733481.8, filed on Dec. 30, 2022, which is hereby incorporated by reference in its entirety.

TECHNICAL FIELD

One or more embodiments of this specification relate to the computer field, and in particular, to secure-fragment-conversion methods and apparatuses for protecting privacy data.

BACKGROUND

Currently, data held by different data holders may include privacy information of a user, and data sharing between the data holders may infringe privacy of the user. To implement data circulation between multiple parties, secure multi-party computation is used to support joint computation between the multiple parties, so as to explore the value of data and ensure that plaintext information of privacy data of the parties is not leaked during interaction between the multiple parties.

Secure multi-party computation can enable multiple parties that do not trust each other to safely compute a given function, without leaking inputs and intermediate computing results except results. Secret sharing is a method for distributing a secret to different participants. Each participant obtains a part of the secret, which is called a fragment. The secret can be restored only when enough fragments are held. The secret cannot be restored by using a single fragment.

Secret sharing is widely applied to various secure-computing scenarios due to its high efficiency in arithmetic computing and linear algebra computing. Secret sharing-based computing usually involves fragment conversion which converts fragments of one secret on rings of different sizes. The fragment conversion includes fragment reduction from a large ring to a small ring and fragment extension from a small ring to a large ring. In conventional technologies, efficiency is low to protect privacy data during implementation of fragment conversion. Therefore, secure fragment conversion for protecting privacy data needs to be provided, which can protect privacy data while achieving high efficiency.

SUMMARY

One or more embodiments of this specification describe secure-fragment-conversion methods and apparatuses for protecting privacy data, which can protect privacy data and achieve high efficiency.

According to a first aspect, a secure-fragment-conversion method for protecting privacy data is provided. The privacy data are split into a first fragment, a second fragment, and a third fragment in a first ring for performing a modulo operation on a first value, and the first value is 2 to the power of m; and a first party holds the first fragment and the second fragment, a second party holds the second fragment and the third fragment, a third party holds the third fragment and the first fragment, and the method is performed by the first party or the third party and includes the following: the two local fragments held by the local party are updated by adding an offset to the first fragment, where the offset enables offset data obtained by performing addition on updated fragments of each party to be greater than or equal to 0; multi-party joint computation is performed by using the two updated local fragments together with the fragments held by the other two parties to obtain two overflow fragments of an overflow bit and in a second ring for performing a modulo operation on a second value, where the second value is 2 to the power of n, and m is less than n; and the overflow bit indicates whether the offset data are greater than or equal to the first value; and two converted fragments in the second ring are obtained based on the two updated local fragments, the two overflow fragments, and the offset.

In a possible implementation, that two converted fragments in the second ring are obtained includes the following: an operation is performed in the second ring for each updated local fragment based on a product of a corresponding overflow fragment and the first value to obtain a corresponding intermediate fragment; and the offset is subtracted from an intermediate fragment corresponding to the first fragment to obtain a converted fragment of the intermediate fragment and in the second ring; and the other intermediate fragment is used as the other converted fragment.

In a possible implementation, a lower limit of a value range of the privacy data is 2 to the negative power of (l−1), an upper limit of the value range of the privacy data is 2 to the power of (l−1) minus 1, and l is less than m; and the offset is 2 to the power of (l−1).

In a possible implementation, the multi-party joint computation includes the following: two first Boolean fragments of a first most significant bit of the updated first fragment are locally constructed; two second Boolean fragments of a second most significant bit are received from the second party, where the second most significant bit corresponds to a most significant bit of first converted data obtained by a sum of the second fragment and the third fragment mod the first value; first multi-party joint sub-computation is performed with the other two parties by using the two first Boolean fragments and the two second Boolean fragments to obtain two third Boolean fragments of a first overflow bit, where the first overflow bit indicates whether a sum of the first converted data and the updated first fragment is greater than or equal to the first value; second multi-party joint sub-computation is performed with the other two parties by using the two third Boolean fragments to obtain two first overflow fragments of the first overflow bit and in the second ring; and local computation is performed based on the two first overflow fragments to obtain the two overflow fragments.

Further, the multi-party joint computation further includes the following: two second overflow fragments of a second overflow bit and in the second ring are received from the second party, where the second overflow bit indicates whether the sum of the second fragment and the third fragment is greater than or equal to the first value; and that local computation is performed based on the two first overflow fragments to obtain the two overflow fragments includes the following: local summation is performed on the first overflow fragment and the second overflow fragment to obtain one overflow fragment in the two overflow fragments.

According to a second aspect, a secure-fragment-conversion method for protecting privacy data is provided. The privacy data are split into a first fragment, a second fragment, and a third fragment in a first ring for performing a modulo operation on a first value, and the first value is 2 to the power of m; and a first party holds the first fragment and the second fragment, a second party holds the second fragment and the third fragment, a third party holds the third fragment and the first fragment, and the method is performed by the second party and includes the following: multi-party joint computation is performed by using the two fragments held by the local party and updated fragments of the other two parties to obtain two overflow fragments of an overflow bit and in a second ring for performing a modulo operation on a second value, where the second value is 2 to the power of n, and m is less than n; the updated fragments of the other two parties are obtained by adding an offset to the first fragment, and the offset enables offset data obtained by performing addition on the updated fragments of each party to be greater than or equal to 0; and the overflow bit indicates whether the offset data are greater than or equal to the first value; and two converted fragments in the second ring are obtained based on the two local fragments and the two overflow fragments.

In a possible implementation, that two converted fragments in the second ring are obtained includes the following: an operation is performed in the second ring for each local fragment based on a product of a corresponding overflow fragment and the first value to obtain a converted fragment of the local fragment and in the second ring.

In a possible implementation, the multi-party joint computation includes the following: two agreed Boolean values are selected as two locally constructed first Boolean fragments of a first most significant bit of the first fragment; a second most significant bit is locally computed, where the second most significant bit corresponds to a most significant bit of first converted data obtained by a sum of the second fragment and the third fragment mod the first value; three second Boolean fragments of the second most significant bit are locally constructed, two of the three second Boolean fragments are retained, and the Boolean fragments of the second most significant bit are shared with the other two parties by using a secret sharing method; first multi-party joint sub-computation is performed with the other two parties by using the two first Boolean fragments and the two second Boolean fragments to obtain two third Boolean fragments of a first overflow bit, where the first overflow bit indicates whether a sum of the first converted data and the updated first fragment is greater than or equal to the first value; second multi-party joint sub-computation is performed with the other two parties by using the two third Boolean fragments to obtain two first overflow fragments of the first overflow bit and in the second ring; and local computation is performed based on the two first overflow fragments to obtain the two overflow fragments.

Further, the multi-party joint computation further includes the following: a second overflow bit is locally computed, where the second overflow bit indicates whether a sum of the second fragment and the third fragment is greater than or equal to the first value; three second overflow fragments of the second overflow bit and in the second ring are locally constructed, two of the three second overflow fragments are retained, and the overflow fragments of the second overflow bit are shared with the other two parties by using a secret sharing method; and that local computation is performed based on the two first overflow fragments to obtain the two overflow fragments includes the following: local summation is performed on the first overflow fragment and the second overflow fragment to obtain one overflow fragment in the two overflow fragments.

According to a third aspect, a secure-fragment-conversion method for protecting privacy data is provided. The privacy data are split into a first fragment, a second fragment, and a third fragment in a first ring for performing a modulo operation on a first value, and the first value is 2 to the power of m; and a first party holds the first fragment and the second fragment, a second party holds the second fragment and the third fragment, a third party holds the third fragment and the first fragment, and the method is performed by the first party or the third party and includes the following: the two local fragments held by the local party are updated by adding an offset to the first fragment, where the offset enables offset data obtained by performing addition on updated fragments of each party to be greater than or equal to 0; two groups of random fragments of a random number that correspond to the local party and two significant-bit fragments of a most significant bit of the random number and in a second ring for performing a modulo operation on a second value are obtained, where the second value is 2 to the power of n, and m is less than n; multi-party joint computation is performed with the other two parties by using the two updated local fragments, the two groups of random fragments, and the two significant-bit fragments to obtain two overflow fragments of an overflow bit and in the second ring, where the overflow bit is used to indicate whether a sum of the offset data and the random number is greater than or equal to the first value; and two converted fragments in the second ring are obtained based on the two overflow fragments, the two groups of random fragments, and the offset.

In a possible implementation, the two groups of random fragments include two first random fragments of the random number and in the first ring and two second random fragments of the random number and in the second ring; and the obtaining two overflow fragments of an overflow bit and in the second ring includes the following: first joint computation is performed with the other two parties by using the two updated local fragments and the two first random fragments to obtain obfuscated data; and the two overflow fragments are locally computed based on a most significant bit of the obfuscated data and the two significant-bit fragments.

Further, that two converted fragments in the second ring are obtained includes the following: two intermediate fragments are locally computed based on the obfuscated data, the two second random fragments, and the two overflow fragments; and the offset is subtracted from an intermediate fragment corresponding to the first fragment to obtain a converted fragment of the intermediate fragment and in the second ring; and the other intermediate fragment is used as the other converted fragment.

Further, the two first random fragments, the two second random fragments, and the two significant-bit fragments are pre-generated in the following way: two random bit fragments of each of m bits are generated in the second ring by performing multi-party joint sub-computation with the other two parties, where the m bits correspond to bits of the random number; the two second random fragments of the random number and in the second ring are locally computed based on random bit fragments held by the local party; and the two first random fragments are obtained by local computation based on the two second random fragments of the random number that are held by the local party.

Further, that the two first random fragments are obtained by local computation includes the following: a modulo operation on the first value is separately performed for the two second random fragments of the random number that are held by the local party to obtain the two first random fragments.

Further, the first joint computation includes the following: a corresponding sum of the two updated local fragments and the two first random fragments is locally computed to obtain two local obfuscated fragments; an interactive obfuscated fragment other than the two local obfuscated fragments is received from either of the other two parties; and local summation is performed on the two local obfuscated fragments and the interactive obfuscated fragment to obtain the obfuscated data.

According to a fourth aspect, a secure-fragment-conversion method for protecting privacy data is provided. The privacy data are split into a first fragment, a second fragment, and a third fragment in a first ring for performing a modulo operation on a first value, and the first value is 2 to the power of m; and a first party holds the first fragment and the second fragment, a second party holds the second fragment and the third fragment, a third party holds the third fragment and the first fragment, and the method is performed by the second party and includes the following: two groups of random fragments of a random number that correspond to the local party and two significant-bit fragments of a most significant bit of the random number and in a second ring for performing a modulo operation on a second value are obtained, where the second value is 2 to the power of n, and m is less than n; multi-party joint computation is performed by using the two fragments held by the local party, the two groups of random fragments, the two significant-bit fragments, and updated fragments of the other two parties to obtain two overflow fragments of an overflow bit and in the second ring, where the updated fragments of the other two parties are obtained by adding an offset to the first fragment, and the offset enables offset data obtained by performing addition on the updated fragments of each party to be greater than or equal to 0; and the overflow bit is used to indicate whether a sum of the offset data and the random number is greater than or equal to the first value; and two converted fragments in the second ring are obtained based on the two overflow fragments and the two groups of random fragments.

In a possible implementation, the two groups of random fragments include two first random fragments of the random number and in the first ring and two second random fragments of the random number and in the second ring; and the obtaining two overflow fragments of an overflow bit and in the second ring includes the following: first joint computation is performed with the other two parties by using the two fragments held by the local party and the two first random fragments to obtain obfuscated data; and the two overflow fragments are locally computed based on a most significant bit of the obfuscated data and the two significant-bit fragments.

Further, that two converted fragments in the second ring are obtained includes the following: the two converted fragments are locally computed based on the obfuscated data, the two second random fragments, and the two overflow fragments.

According to a fifth aspect, a secure-fragment-conversion method for protecting privacy data is provided. The privacy data are split into a first fragment, a second fragment, and a third fragment in a first ring for performing a modulo operation on a first value, and the first value is 2 to the power of n; and a first party holds the first fragment and the second fragment, a second party holds the second fragment and the third fragment, a third party holds the third fragment and the first fragment, and the method is performed by any one of the first party, the second party, and the third party and includes the following: a modulo operation on a second value is performed for the two local fragments held by the local party to obtain two converted fragments of the privacy data and in a second ring for performing a modulo operation on the second value, where the second value is 2 to the power of m, and m is less than n.

According to a sixth aspect, a secure-fragment-conversion apparatus for protecting privacy data is provided. The privacy data are split into a first fragment, a second fragment, and a third fragment in a first ring for performing a modulo operation on a first value, and the first value is 2 to the power of m; and a first party holds the first fragment and the second fragment, a second party holds the second fragment and the third fragment, a third party holds the third fragment and the first fragment, and the apparatus is disposed in the first party or the third party and includes the following: an offset unit, configured to update, by adding an offset to the first fragment, the two local fragments held by the local party, where the offset enables offset data obtained by performing addition on updated fragments of each party to be greater than or equal to 0; an overflow unit, configured to perform multi-party joint computation by using the two updated local fragments obtained by the offset unit together with the fragments held by the other two parties to obtain two overflow fragments of an overflow bit and in a second ring for performing a modulo operation on a second value, where the second value is 2 to the power of n, and m is less than n; and the overflow bit indicates whether the offset data are greater than or equal to the first value; and a conversion unit, configured to obtain two converted fragments in the second ring based on the two updated local fragments obtained by the offset unit, the two overflow fragments obtained by the overflow unit, and the offset.

According to a seventh aspect, a secure-fragment-conversion apparatus for protecting privacy data is provided. The privacy data are split into a first fragment, a second fragment, and a third fragment in a first ring for performing a modulo operation on a first value, and the first value is 2 to the power of m; and a first party holds the first fragment and the second fragment, a second party holds the second fragment and the third fragment, a third party holds the third fragment and the first fragment, and the apparatus is disposed in the second party and includes the following: an overflow unit, configured to perform multi-party joint computation by using the two fragments held by the local party and updated fragments of the other two parties to obtain two overflow fragments of an overflow bit and in a second ring for performing a modulo operation on a second value, where the second value is 2 to the power of n, and m is less than n; the updated fragments of the other two parties are obtained by adding an offset to the first fragment, and the offset enables offset data obtained by performing addition on the updated fragments of each party to be greater than or equal to 0; and the overflow bit indicates whether the offset data are greater than or equal to the first value; and a conversion unit, configured to obtain two converted fragments in the second ring based on the two local fragments and the two overflow fragments obtained by the overflow unit.

According to an eighth aspect, a secure-fragment-conversion apparatus for protecting privacy data is provided. The privacy data are split into a first fragment, a second fragment, and a third fragment in a first ring for performing a modulo operation on a first value, and the first value is 2 to the power of m; and a first party holds the first fragment and the second fragment, a second party holds the second fragment and the third fragment, a third party holds the third fragment and the first fragment, and the apparatus is disposed in the first party or the third party and includes the following: an offset unit, configured to update, by adding an offset to the first fragment, the two local fragments held by the local party, where the offset enables offset data obtained by performing addition on updated fragments of each party to be greater than or equal to 0; an acquisition unit, configured to obtain two groups of random fragments of a random number that correspond to the local party and two significant-bit fragments of a most significant bit of the random number and in a second ring for performing a modulo operation on a second value, where the second value is 2 to the power of n, and m is less than n; an overflow unit, configured to perform multi-party joint computation with the other two parties by using the two updated local fragments obtained by the offset unit and the two groups of random fragments and the two significant-bit fragments obtained by the acquisition unit to obtain two overflow fragments of an overflow bit and in the second ring, where the overflow bit is used to indicate whether a sum of the offset data and the random number is greater than or equal to the first value; and a conversion unit, configured to obtain two converted fragments in the second ring based on the two overflow fragments obtained by the overflow unit, the two groups of random fragments obtained by the acquisition unit, and the offset.

According to a ninth aspect, a secure-fragment-conversion apparatus for protecting privacy data is provided. The privacy data are split into a first fragment, a second fragment, and a third fragment in a first ring for performing a modulo operation on a first value, and the first value is 2 to the power of m; and a first party holds the first fragment and the second fragment, a second party holds the second fragment and the third fragment, a third party holds the third fragment and the first fragment, and the apparatus is disposed in the second party and includes the following: an acquisition unit, configured to obtain two groups of random fragments of a random number that correspond to the local party and two significant-bit fragments of a most significant bit of the random number and in a second ring for performing a modulo operation on a second value, where the second value is 2 to the power of n, and m is less than n; an overflow unit, configured to perform multi-party joint computation by using the two fragments held by the local party, the two groups of random fragments and the two significant-bit fragments obtained by the acquisition unit, and updated fragments of the other two parties to obtain two overflow fragments of an overflow bit and in the second ring, where the updated fragments of the other two parties are obtained by adding an offset to the first fragment, and the offset enables offset data obtained by performing addition on the updated fragments of each party to be greater than or equal to 0; and the overflow bit is used to indicate whether a sum of the offset data and the random number is greater than or equal to the first value; and a conversion unit, configured to obtain two converted fragments in the second ring based on the two overflow fragments obtained by the overflow unit and the two groups of random fragments obtained by the acquisition unit.

According to a tenth aspect, a secure-fragment-conversion apparatus for protecting privacy data is provided. The privacy data are split into a first fragment, a second fragment, and a third fragment in a first ring for performing a modulo operation on a first value, and the first value is 2 to the power of n; and a first party holds the first fragment and the second fragment, a second party holds the second fragment and the third fragment, a third party holds the third fragment and the first fragment, and the apparatus is disposed in any one of the first party, the second party, and the third party and includes the following: a modulo unit, configured to perform a modulo operation on a second value for the two local fragments held by the local party to obtain two converted fragments of the privacy data and in a second ring for performing a modulo operation on the second value, where the second value is 2 to the power of m, and m is less than n.

According to an eleventh aspect, a computer-readable storage medium is provided. The computer-readable storage medium stores a computer program. When the computer program is executed in a computer, the computer is enabled to perform the method according to any one of the first aspect to the fifth aspect.

According to a twelfth aspect, a computing device is provided, including a memory and a processor. The memory stores executable code. When executing the executable code, the processor implements the method according to any one of the first aspect to the fifth aspect.

According to the methods and apparatuses provided in the embodiments of this specification, the methods are used to implement fragment extension from a small ring to a large ring. First, based on the three-party replicated secret sharing scenario, the first party or the third party updates the two local fragments held by the local party by adding the offset to the first fragment, where the offset enables the offset data obtained by performing addition on the updated fragments of each party to be greater than or equal to 0; then, the first party or the third party performs multi-party joint computation by using the two updated local fragments together with the fragments held by the other two parties to obtain the two overflow fragments of the overflow bit; the other two parties also separately obtain two overflow fragments of the overflow bit that are held by the two parties, where the overflow bit indicates whether the offset data are greater than or equal to the first value; finally, the first party or the third party obtains the two converted fragments based on the two updated local fragments, the two overflow fragments, and the offset; and correspondingly, the second party obtains the two converted fragments based on the two local fragments and the two overflow fragments. It can be determined from the descriptions above that, in the embodiments of this specification, initially, an offset is added to the privacy data, so that the offset data are a positive number, and the privacy data can be processed into two cases: a signed integer and an unsigned integer. Subsequently, the overflow fragments of the overflow bit are obtained by performing multi-party joint computation. Based on the overflow fragments, a potential overflow is subtracted from the offset data, and impact of the initially added offset is eliminated to obtain an expected output. In the embodiments, fragment extension is implemented by directly computing the overflow bit, so that the privacy data can be protected and high efficiency can be achieved.

According to other methods and apparatuses provided in the embodiments of this specification, the methods are used to implement fragment extension from a small ring to a large ring. First, based on the three-party replicated secret sharing scenario, the first party or the third party updates the two local fragments held by the local party by adding the offset to the first fragment, where the offset enables the offset data obtained by performing addition on the updated fragments of each party to be greater than or equal to 0; then, each party obtains two groups of random fragments of the random number that correspond to the local party and the two significant-bit fragments of the most significant bit of the random number; subsequently, the first party or the third party performs multi-party joint computation by using the two updated local fragments, the two groups of random fragments, and the two significant-bit fragments to obtain the two overflow fragments of the overflow bit; the other two parties also separately obtain two overflow fragments of the overflow bit that are held by the two parties, where the overflow bit is used to indicate whether the sum of the offset data and the random number is greater than or equal to the first value; finally, the first party or the third party obtains the two converted fragments based on the two overflow fragments, the two groups of random fragments, and the offset; and correspondingly, the second party obtains the two converted fragments based on the two overflow fragments and the two groups of random fragments. It can be determined from the descriptions above that, in the embodiments of this specification, initially, an offset is added to the privacy data, so that the offset data are a positive number, and the privacy data can be processed into two cases: a signed integer and an unsigned integer. Subsequently, the overflow fragments of the overflow bit are obtained by performing multi-party joint computation. The multi-party joint computation masks the offset data by using the random number. Based on the overflow fragments, a potential overflow is subtracted from the offset data, and impact of the initially added offset is eliminated to obtain an expected output. In the embodiments, fragment extension is implemented by indirectly computing the overflow bit by using the random number, and the random number can be generated in a pre-computation phase, so that overheads in an online phase can be reduced, the privacy data can be protected, and high efficiency can be achieved.

According to other methods and apparatuses provided in the embodiments of this specification, the methods are used to implement fragment reduction from a large ring to a small ring. Based on the three-party replicated secret sharing scenario, any one of the three parties performs a modulo operation on the second value for the two local fragments held by the local party to obtain the two converted fragments of the privacy data. It can be determined from the descriptions above that, in the embodiments of this specification, each party performs a modulo operation on the locally held fragments, so that fragment reduction can be implemented, the privacy data can be protected, and high efficiency can be achieved.

BRIEF DESCRIPTION OF DRAWINGS

To describe the technical solutions in the embodiments of this specification more clearly, the following briefly describes the accompanying drawings needed for describing the embodiments. Clearly, the accompanying drawings in the following descriptions show merely some embodiments of this specification, and a person of ordinary skill in the art can still derive other accompanying drawings from these accompanying drawings without creative efforts.

FIG. 3 is a flowchart illustrating a secure-fragment-conversion method for protecting privacy data, according to some other embodiments;

FIG. 4 is a flowchart illustrating a secure-fragment-conversion method for protecting privacy data, according to some other embodiments;

FIG. 5 is a flowchart illustrating a secure-fragment-conversion method for protecting privacy data, according to some other embodiments;

DESCRIPTION OF EMBODIMENTS

The following describes the solutions provided in this specification with reference to the accompanying drawings.

Figure 1:
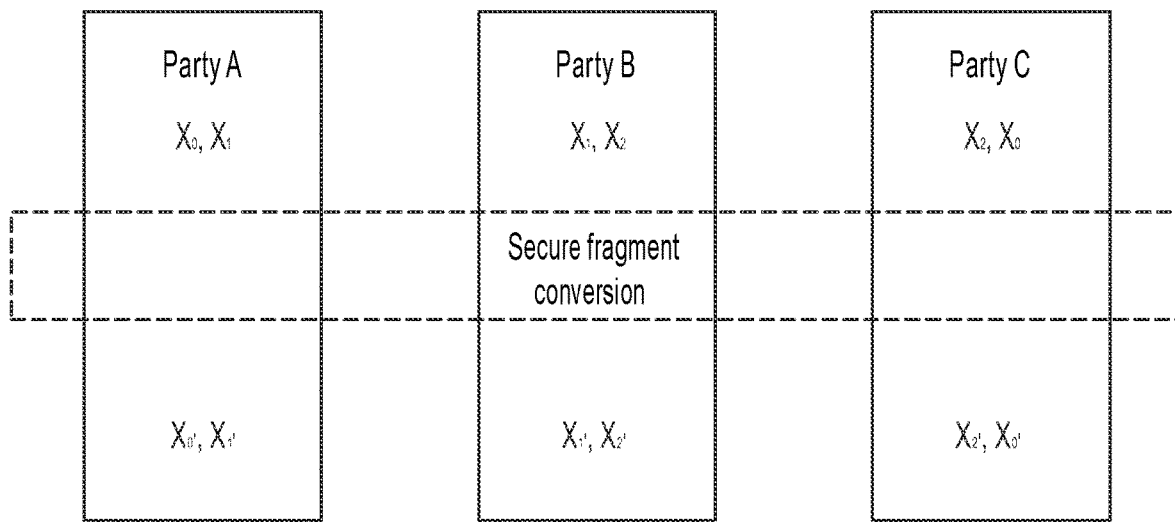
FIG. 1 is a schematic diagram illustrating an implementation scenario, according to some embodiments disclosed in this specification.

FIG. 1 is a schematic diagram illustrating an implementation scenario, according to some embodiments disclosed in this specification. This implementation scenario relates to secure fragment conversion for protecting privacy data. It can be understood that, fragment conversion is used to convert fragments of one secret on rings of different sizes. The fragment conversion includes fragment reduction from a large ring to a small ring and fragment extension from a small ring to a large ring. The above-mentioned secret is privacy data, and secure fragment conversion needs to ensure that the privacy data are not leaked. The above-mentioned fragment is a part of the secret, and is a fragment in secret sharing. As shown in FIG. 1, a scenario of secure fragment conversion for protecting privacy data involves participant A, participant B, and participant C, which are also referred to as a first party, a second party, and a third party, or referred to as party A, party B, and party C, or referred to as P0, P1, and P2. Each participant can be implemented as any device, platform, server, or device cluster with computing and processing capabilities. All parties need to jointly implement fragment conversion while protecting data privacy.

In actual computing scenarios, for example, machine learning is usually based on floating-point number operations. However, implementing secure floating-point number operations by using secret sharing leads to relatively high overheads, and it is difficult for efficiency achieved in this way to satisfy actual computing requirements. Therefore, common practice is to use a fixed-point number to approximate a floating-point number, thereby achieving relatively large-scale efficiency optimization at a compromise of a certain precision loss. A secret sharing protocol is usually defined on a ring or a domain, and either way has its own advantages and disadvantages. Computation on a ring can be implicitly performed by hardware because of its modulo operation, and therefore has higher computing efficiency than computation on a domain, which needs a manual modulo operation.

In some embodiments of this specification, a fixed-point number can be mapped to a ring for an operation. A mapping construction process is as follows: Assuming that $\tilde{x}$ is a rational number and $\tilde{x}$ needs to be mapped to an integer domain, let $\bar{x}=\text{Int}(\tilde{x}*2^f)$, where f represents a quantity of decimal places for precision, i.e., a quantity of digits in a fractional part, and $\text{Int}(\cdot)$ represents rounding off to the nearest integer. Then, a modulo operation is performed on $\bar{x}$ so that $x = \bar{x} \bmod 2^k$, where k represents a quantity of bits of x, and an input is mapped to a ring $\mathbb{Z}_{2^k}$.

Fragment conversion involves arithmetic sharing of fixed-point numbers on rings of different sizes, i.e., $\mathbb{Z}_{2^m}$ and $\mathbb{Z}_{2^n}$, which respectively correspond to different parameters k and f. In addition, Boolean sharing is further combined and computed on a ring $\mathbb{Z}_2$.

In some embodiments of this specification, three computing parties P0, P1, and P2 are involved. A secret input x is split into three fragments $(x_0, X_1, X_2)$, and the following is satisfied: Pi holds $(x_i, x_{i+1})$, and $x=(x_0+x_1+x_2) \bmod 2^k$.

The embodiments of this specification can correspond to a secure and efficient fragment conversion protocol that is based on a three-party replicated secret sharing protocol, and the secure and efficient fragment conversion protocol is used to implement fragment reduction from a large ring to a small ring and fragment extension from a small ring to a large ring. For example, the two rings are respectively $\mathbb{Z}_{2^m}$ and $\mathbb{Z}_{2^n}$, and m<n. Fragment reduction from a large ring to a small ring is $\mathbb{Z}_{2^n} \to \mathbb{Z}_{2^m}$; and fragment extension from a small ring to a large ring is $\mathbb{Z}_{2^m} \to \mathbb{Z}_{2^n}$.

Fragment reduction from a large ring to a small ring $\mathbb{Z}_{2^n} \to \mathbb{Z}_{2^m}$ is used as an example. Party A holds two fragments $x_0$ and $x_1$ of privacy data x on the ring $\mathbb{Z}_{2^n}$, party B holds two fragments $x_1$ and $x_2$ of the privacy data x on the ring $\mathbb{Z}_{2^n}$, and party C holds two fragments $x_2$ and $x_0$ of the privacy data x on the ring $\mathbb{Z}_{2^n}$. In other words, $x=(x_0+x_1+x_2) \bmod 2^n$. Two fragments of the privacy data x on the ring $\mathbb{Z}_{2^n}$ that are held by each party are obtained without leaking the privacy data x, so as to implement secure fragment conversion. In other words, two fragments $x_0'$ and $x_1'$ of the privacy data x on the ring $\mathbb{Z}_{2^m}$ that are held by party A need to be obtained, two fragments $x_1'$ and $x_2'$ of the privacy data x on the ring $\mathbb{Z}_{2^m}$ that are held by party B need to be obtained, and two fragments $x_2'$ and $x_0'$ of the privacy data x on the ring $\mathbb{Z}_{2^m}$ that are held by party C need to be obtained, i.e., the following is satisfied: $x=(x_0+x_1+x_2) \bmod 2^m$ or $(x_0+x_1+x_2) \bmod 2^n = (x_0+x_1+x_2) \bmod 2^m$.

Fragment extension from a small ring to a large ring $\mathbb{Z}_{2^m} \to \mathbb{Z}_{2^n}$ is similar to the description above. Details are omitted here for simplicity.

In the embodiments of this specification, secure fragment conversion is implemented by secure multi-party computation. This solution is used for three parties. Each party Pi uses two fragments of privacy data in a first ring as an input, and the two fragments are represented as $(x_i, x_{i+1})$. The three parties together want to compute two fragments of the privacy data in a second ring without leaking the privacy data, and the two fragments are represented as $(x_i', x_{i+1}')$.

In the embodiments of this specification, a corresponding solution is proposed for improving conversion efficiency in secure fragment conversion for protecting privacy data.

The embodiments of this specification can be used for secure computation in various scenarios, for example, secure training and secure prediction of a machine learning model. With secure fragment conversion, rings of different precision and different sizes can be flexibly used for different sub-computation, thereby reducing communication overheads and improving overall computing efficiency.

Based on the implementation scenario shown in FIG. 1, the following describes how to implement fragment reduction from a large ring to a small ring $\mathbb{Z}_{2^n} \to \mathbb{Z}_{2^m}$.

In consideration of fragment reduction from a large ring to a small ring $\mathbb{Z}_{2^n} \to \mathbb{Z}_{2^m}$, because m<n, $(w*2^n) \bmod 2^m = 0$, where w indicates whether a sum of fragments of x in $\mathbb{Z}_{2^n}$ has an overflow of $2^n$. Therefore, the following equation holds true:

$$x = (x_0 + x_1 + x_2 - w*2^n) \bmod 2^m$$
$$= (x_0 \bmod 2^m) + (x_1 \bmod 2^m) + (x_2 \bmod 2^m)$$
$$= (x_0' + x_1' + x_2') \bmod 2^m$$

Therefore, the following can be obtained: $[\![x]\!]_s = \{x_0', x_1', x_2'\}$, i.e., each party can complete a fragment reduction operation by locally performing a modulo operation on $2^m$ for the fragments held by the party. It can be understood that, $[\![x]\!]_s$ represents a fragment of x in $\mathbb{Z}_{2^m}$, $[\![x]\!]_n$ represents a fragment of x in $\mathbb{Z}_{2^n}$, and $[\![x]\!]_n = \{x_0, x_1, x_2\}$.

According to some embodiments of this specification, a secure-fragment-conversion method for protecting privacy data is provided. The privacy data are split into a first fragment, a second fragment, and a third fragment in a first ring for performing a modulo operation on a first value, and the first value is 2 to the power of n; and a first party holds the first fragment and the second fragment, a second party holds the second fragment and the third fragment, a third party holds the third fragment and the first fragment, and the method is performed by any one of the first party, the second party, and the third party and includes the following: a modulo operation on a second value is performed for the two local fragments held by the local party to obtain two converted fragments of the privacy data and in a second ring for performing a modulo operation on the second value, where the second value is 2 to the power of m, and m is less than n.

For example, any one of the three parties can be represented as Pi, $i \in [0, 2]$, and a fragment held by Pi is denoted as $(x_i, x_{i+1})$. Pi locally computes $x_i' = x_i \bmod 2^m$ and $x_{i+1}' = x_{i+1} \bmod 2^m$, so that $(x_0' + x_1' + x_2') \bmod 2^m = (x_0 + x_1 + x_2) \bmod 2^m$.

According to the methods provided in the embodiments of this specification, the method is used to implement fragment reduction from a large ring to a small ring. Based on the three-party replicated secret sharing scenario, any one of the three parties performs a modulo operation on the second value for the two local fragments held by the local party to obtain the two converted fragments of the privacy data. It can be determined from the descriptions above that, in the embodiments of this specification, each party performs a modulo operation on the locally held fragments, so that fragment reduction can be implemented, the privacy data can be protected, and high efficiency can be achieved.

Based on the implementation scenario shown in FIG. 1, the following describes how to implement fragment extension from a small ring to a large ring $\mathbb{Z}_{2^m} \to \mathbb{Z}_{2^n}$.

In consideration of fragment extension from a small ring to a large ring $\mathbb{Z}_{2^m} \to \mathbb{Z}_{2^n}$, it is noted that because m<n, $(w*2^m) \bmod 2^n$ is unnecessarily equal to 0, and an overflow bit w here needs to be explicitly computed. In the embodiments of this specification, two methods are proposed to efficiently compute w. One method is to directly compute w, and the other method is to indirectly compute w by using a random number. Fragment extension is implemented based on the obtained overflow bit w. Assuming that a value range of the input x is $[-2^{l-1}, 2^{l-1}-1]$ and l<m, an m-bit integer is enough to encode x.

The method for directly computing w is as follows:

Fragment extension is completed by directly computing w based on an equation $x = (x_0 + x_1 + x_2 - w*2^m) \bmod 2^n$. To process both signed and unsigned integers at the same time, an offset $2^{l-1}$ is first added to the input x. Therefore, $x' = x + 2^{l-}$ $i \in [0, 2^l-1)$, which must be a positive number. Then, the Pos_Wrap sub-protocol is invoked to compute fragments of w, and a potential overflow is subtracted, i.e., $x_i'=(x_i'-w_i*2^m) \bmod 2^n$. Finally, impact of the initially added offset needs to be eliminated. Therefore, the offset $2^{l-1}$ is subtracted from the above-mentioned result to obtain an expected output.

Next, the Pos_Wrap sub-protocol is described.

An input of this protocol is fragments of x on $\mathbb{Z}_{2^m}$, and an output of this protocol is fragments of w on the target ring $\mathbb{Z}_{2^n}$. First, 2-out-of-3 replicated secret sharing is converted into 2-out-of-2 additive secret sharing of $\langle x_0', x_1' \rangle$, $x_0'=x_0$, $x_1'=(x_1+x_2) \bmod 2^m$, and P1 locally computes $w_0=(x_1+x_2) \geq 2^m$. Then, P1 splits $w_0$ into fragments by using the replicated secret sharing protocol and sends the fragments to another computing party. In addition, the following further needs to be computed: $w_1=(x_0'+x_1') \geq 2^m$. It can be determined by computation based on an equation $w_1=((1 \oplus msb_x) \wedge (msb_0 \oplus msb_1)) \oplus (msb_0 \wedge msb_1)$, $msb_x$ represents a most significant bit of x, and $msb_0$ and $msb_1$ respectively represent most significant bits of $x_0'$ and $x_1'$. As the offset is added to the input to ensure that the input is a positive number, $msb_x=0$. The above-mentioned equation can be simplified into $w_1=(msb_0 \oplus msb_1) \oplus (msb_0 \wedge msb_1)$, and a Boolean share of $w_1$ can be obtained by using a standard Boolean operation. Then, a B2A protocol is used to convert Boolean sharing of $w_1$ into arithmetic sharing, and compute a sum of $w_0$ and $w_1$ to obtain the fragments of w on $\mathbb{Z}_{2^n}$.

Figure 2:
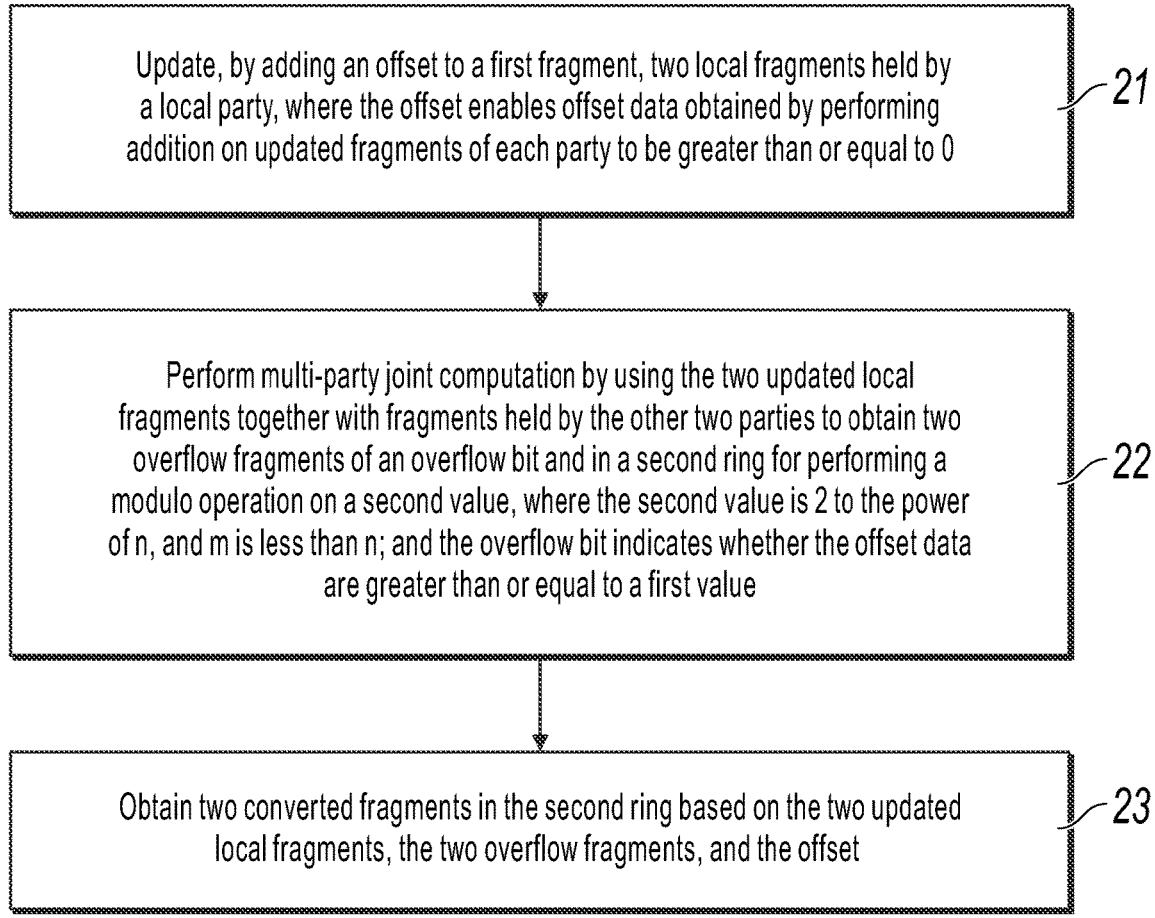
FIG. 2 is a flowchart illustrating a secure-fragment-conversion method for protecting privacy data, according to some embodiments.

FIG. 2 is a flowchart illustrating a secure-fragment-conversion method for protecting privacy data, according to some embodiments. Based on the implementation scenario shown in FIG. 1, the method can implement secure fragment conversion by directly computing the overflow bit w. The privacy data are split into a first fragment, a second fragment, and a third fragment in a first ring for performing a modulo operation on a first value, and the first value is 2 to the power of m; and a first party holds the first fragment and the second fragment, a second party holds the second fragment and the third fragment, a third party holds the third fragment and the first fragment, and the method is performed by the first party or the third party. As shown in FIG. 2, the secure-fragment-conversion method for protecting privacy data in the embodiments includes the following steps: Step 21: Update, by adding an offset to the first fragment, the two local fragments held by the local party, where the offset enables offset data obtained by performing addition on updated fragments of each party to be greater than or equal to 0. Step 22: Perform multi-party joint computation by using the two updated local fragments together with fragments held by the other two parties to obtain two overflow fragments of an overflow bit and in a second ring for performing a modulo operation on a second value, where the second value is 2 to the power of n, and m is less than n; and the overflow bit indicates whether the offset data are greater than or equal to the first value. Step 23: Obtain two converted fragments in the second ring based on the two updated local fragments, the two overflow fragments, and the offset. The following describes specific execution methods of the above-mentioned steps.

First, in step 21, the two local fragments held by the local party are updated by adding the offset to the first fragment, where the offset enables the offset data obtained by performing addition on the updated fragments of each party to be greater than or equal to 0. It can be understood that the privacy data are split into the first fragment, the second fragment, and the third fragment in the first ring for performing a modulo operation on the first value, and adding the offset to the first fragment is adding the offset to the privacy data.

It can be understood that both the first party and the third party have the first fragment, and perform consistent operations on the first fragment.

In a possible implementation, a lower limit of a value range of the privacy data is 2 to the negative power of (l−1), an upper limit of the value range of the privacy data is 2 to the power of (l−1) minus 1, and l is less than m; and the offset is 2 to the power of (l−1).

For example, the fragments of the privacy data in the first ring are denoted as $[\![x]\!]_m=(x_0, x_1, x_2)$ where $x_0$ represents the first fragment, $x_1$ represents the second fragment, and $x_2$ represents the third fragment. An offset $2^{l-1}$ is added to obtain fragments of the offset data in the first ring, and the fragments are denoted as $[\![x']\!]_m=(x_0+2^{l-1}, x_1, x_2)$.

Then, in step 22, multi-party joint computation is performed by using the two updated local fragments together with the fragments held by the other two parties to obtain the two overflow fragments of the overflow bit and in the second ring for performing a modulo operation on the second value, where the second value is 2 to the power of n, and m is less than n; and the overflow bit indicates whether the offset data are greater than or equal to the first value. It can be understood that, an input of the multi-party joint computation includes the fragments of the offset data, the first value, and the second value.

In the embodiments of this specification, the above-mentioned multi-party joint computation can be implemented by invoking the Pos_Wrap sub-protocol. For example, if the fragments of the offset data in the first ring are denoted as $$[\![x']\!]_m = (x_0 + 2^{i-1}, x_1, x_2), [\![w]\!]_n = F_{Pos\_Wrap}(x_0 + 2^{i-1}, x_1, x_2, m, n).$$

In an example, the multi-party joint computation includes the following: two first Boolean fragments of a first most significant bit of the updated first fragment are locally constructed; two second Boolean fragments of a second most significant bit are received from the second party, where the second most significant bit corresponds to a most significant bit of first converted data obtained by a sum of the second fragment and the third fragment mod the first value; first multi-party joint sub-computation is performed with the other two parties by using the two first Boolean fragments and the two second Boolean fragments to obtain two third Boolean fragments of a first overflow bit, where the first overflow bit indicates whether a sum of the first converted data and the updated first fragment is greater than or equal to the first value; second multi-party joint sub-computation is performed with the other two parties by using the two third Boolean fragments to obtain two first overflow fragments of the first overflow bit and in the second ring; and local computation is performed based on the two first overflow fragments to obtain the two overflow fragments.

For example, the first fragment is $x_0$, a first most significant bit of the first fragment is $msb0=MSB(x_0)$, and fragments of msb0 in a replicated secret sharing form are (msb0, 0, 0), where the two first Boolean fragments constructed by the first party are (msb0, 0), and the two first Boolean fragments constructed by the third party are (0, msb0). The first converted data are $x_1'=(x_1+x_2) \bmod 2^m$, the second most significant bit is msb1=MSB($x_1'$), the second Boolean fragment is denoted as ⟦msb₁⟧ᴮ, the first overflow bit is $w_1$=(msb$_0$⊕msb$_1$)⊕(msb$_0$^msb$_1$), the third Boolean fragment is denoted as ⟦$w_i$⟧ᴮ, and the first overflow fragment is denoted as ⟦$w_i$⟧$_n$.

Further, the multi-party joint computation further includes the following: two second overflow fragments of a second overflow bit and in the second ring are received from the second party, where the second overflow bit indicates whether the sum of the second fragment and the third fragment is greater than or equal to the first value; and that local computation is performed based on the two first overflow fragments to obtain the two overflow fragments includes the following: local summation is performed on the first overflow fragment and the second overflow fragment to obtain one overflow fragment in the two overflow fragments.

For example, the second overflow bit is $w_0$=($x_1$+$x_2$)≥$2^m$, the second overflow fragment is denoted as ⟦$w_0$⟧$_n$, and the overflow fragment is ⟦$w$⟧$_n$=⟦$w_0$⟧$_n$+⟦$w_1$⟧$_n$.

Finally, in step 23, two converted fragments in the second ring are obtained based on the two updated local fragments, the two overflow fragments, and the offset. It can be understood that, on the basis of the offset data, a potential overflow is subtracted, and then impact of the initially added offset is eliminated to obtain an expected output.

In an example, that two converted fragments in the second ring are obtained includes the following: an operation is performed in the second ring for each updated local fragment based on a product of a corresponding overflow fragment and the first value to obtain a corresponding intermediate fragment; and the offset is subtracted from an intermediate fragment corresponding to the first fragment to obtain a converted fragment of the intermediate fragment and in the second ring; and the other intermediate fragment is used as the other converted fragment.

For example, an overflow fragment of ⟦$wθ_n$⟧ is denoted as $w_i$, the updated local fragment is denoted as $x_i'$, the intermediate fragment is $x_i'$=($x_i'$−$w_i$*$2^m$)mod $2^n$, the converted fragment is ⟦$xθ_n$⟧=($x_0'$−$2^{l−1}$, $x_1'$, $x_2'$), a converted fragment obtained by the first party is ($x_0'$−$2^{l−1}$, $x_1'$), and a converted fragment obtained by the third party is ($x_2'$, $x_0'$−$2^{l−1}$).

FIG. 3 is a flowchart illustrating a secure-fragment-conversion method for protecting privacy data, according to some other embodiments. Based on the implementation scenario shown in FIG. 1, the method can implement secure fragment conversion by directly computing the overflow bit w. The privacy data are split into a first fragment, a second fragment, and a third fragment in a first ring for performing a modulo operation on a first value, and the first value is 2 to the power of m; and a first party holds the first fragment and the second fragment, a second party holds the second fragment and the third fragment, a third party holds the third fragment and the first fragment, and the method is performed by the second party. As shown in FIG. 3, the secure-fragment-conversion method for protecting privacy data in the embodiments includes the following steps: Step 31: Perform multi-party joint computation by using the two fragments held by the local party and updated fragments of the other two parties to obtain two overflow fragments of an overflow bit and in a second ring for performing a modulo operation on a second value, where the second value is 2 to the power of n, and m is less than n; the updated fragments of the other two parties are obtained by adding an offset to the first fragment, and the offset enables offset data obtained by performing addition on the updated fragments of each party to be greater than or equal to 0; and the overflow bit indicates whether the offset data are greater than or equal to the first value. Step 32: Obtain two converted fragments in the second ring based on the two local fragments and the two overflow fragments. The following describes specific execution methods of the above-mentioned steps.

First, in step 31, multi-party joint computation is performed by using the two fragments held by the local party and the updated fragments of the other two parties to obtain the two overflow fragments of the overflow bit and in the second ring for performing a modulo operation on the second value, where the second value is 2 to the power of n, and m is less than n; the updated fragments of the other two parties are obtained by adding the offset to the first fragment, and the offset enables the offset data obtained by performing addition on the updated fragments of each party to be greater than or equal to 0; and the overflow bit indicates whether the offset data are greater than or equal to the first value. It can be understood that, an input of the multi-party joint computation includes the fragments of the offset data, the first value, and the second value.

It can be understood that, the privacy data are split into the first fragment, the second fragment, and the third fragment in the first ring for performing a modulo operation on the first value, and adding the offset to the first fragment is adding the offset to the privacy data.

In a possible implementation, a lower limit of a value range of the privacy data is 2 to the negative power of (l−1), an upper limit of the value range of the privacy data is 2 to the power of (l−1) minus 1, and l is less than m; and the offset is 2 to the power of (l−1).

For example, the fragments of the privacy data in the first ring are denoted as ⟦$x$⟧$_m$=($X_0$, $x_1$, $x_2$), where $x_0$ represents the first fragment, $x_1$ represents the second fragment, and $x_2$ represents the third fragment. An offset $2^{l−1}$ is added to obtain fragments of the offset data in the first ring, and the fragments are denoted as ⟦$x'$⟧$_m$=($x_0$+$2^{l−1}$, $x_1$, $x_2$). The two fragments ($x_1$, $x_2$) held by the second party remain unchanged.

In the embodiments of this specification, the above-mentioned multi-party joint computation can be implemented by invoking the Pos_Wrap sub-protocol. For example, if the fragments of the offset data in the first ring are denoted as ⟦$x'$⟧$^s_m$=($x_0$+$2^{l−1}$, $x_1$, $x_2$), $$⟦w⟧_n = F_{Pos\_Wrap}(x_0 + 2^{i-1}, x_1, x_2, m, n).$$

In an example, the multi-party joint computation includes the following: two agreed Boolean values are selected as two locally constructed first Boolean fragments of a first most significant bit of the first fragment; a second most significant bit is locally computed, where the second most significant bit corresponds to a most significant bit of first converted data obtained by a sum of the second fragment and the third fragment mod the first value; three second Boolean fragments of the second most significant bit are locally constructed, two of the three second Boolean fragments are retained, and the Boolean fragments of the second most significant bit are shared with the other two parties by using a secret sharing method; first multi-party joint sub-computation is performed with the other two parties by using the two first Boolean fragments and the two second Boolean fragments to obtain two third Boolean fragments of a first overflow bit, where the first overflow bit indicates whether a sum of the first converted data and the updated first fragment is greater than or equal to the first value; second multi-party joint sub-computation is performed with the other two parties by using the two third Boolean fragments to obtain two first overflow fragments of the first overflow bit and in the second ring; and local computation is performed based on the two first overflow fragments to obtain the two overflow fragments.

For example, the first fragment is $x_0$, the first most significant bit of the first fragment is $msb0=MSB(x_0)$, and fragments of msb0 in a replicated secret sharing form are (msb0, 0, 0), where the two first Boolean fragments constructed by the second party are (0, 0). The first converted data are $x_1'=(x_1+x_2) \bmod 2^m$, the second most significant bit is $msb1=MSB(x_1')$, the second Boolean fragment is denoted as $\lfloor msb1 \rfloor^B$, the first overflow bit is $w_1=(msb_0 \oplus msb_1) \oplus (msb_0 \wedge msb_1)$, the third Boolean fragment is denoted as $\lfloor w_1 \rfloor^B$, and the first overflow fragment is denoted as $\lfloor w_1 \rfloor_n$.

Further, the multi-party joint computation further includes the following: a second overflow bit is locally computed, where the second overflow bit indicates whether a sum of the second fragment and the third fragment is greater than or equal to the first value; three second overflow fragments of the second overflow bit and in the second ring are locally constructed, two of the three second overflow fragments are retained, and the overflow fragments of the second overflow bit are shared with the other two parties by using a secret sharing method; and that local computation is performed based on the two first overflow fragments to obtain the two overflow fragments includes the following: local summation is performed on the first overflow fragment and the second overflow fragment to obtain one overflow fragment in the two overflow fragments.

For example, the second overflow bit is $w_0=(x_1+x_2) \geq 2^m$, the second overflow fragment is denoted as $\lfloor w_0 \rfloor_n$, and the overflow fragment is $\lfloor w \rfloor_n = \lfloor w_0 \rfloor_n + \lfloor w_1 \rfloor_n$.

Then, in step 32, the two converted fragments in the second ring are obtained based on the two local fragments and the two overflow fragments. It can be understood that, the two local fragments held by the second party are not affected by the offset, and on the basis of the offset data, a potential overflow is subtracted to obtain an expected output.

In an example, that two converted fragments in the second ring are obtained includes the following: an operation is performed in the second ring for each local fragment based on a product of a corresponding overflow fragment and the first value to obtain a converted fragment of the local fragment and in the second ring.

For example, an overflow fragment of $\lfloor w \rfloor_n$ is denoted as $w_i$, the updated local fragment is denoted as $x_i'$, an intermediate fragment is $x_i'=(x_i'-w_i*2^m) \bmod 2^n$, the converted fragment is $\lfloor x \rfloor_n = (x_0'-2^{l-1}, x_1', x_2')$, and a converted fragment obtained by the second party is $(x_1', x_2')$, which is the above-mentioned intermediate fragment.

According to the method provided in the embodiments of this specification, the method is used to implement fragment extension from a small ring to a large ring. First, based on the three-party replicated secret sharing scenario, the first party or the third party updates the two local fragments held by the local party by adding the offset to the first fragment, where the offset enables the offset data obtained by performing addition on the updated fragments of each party to be greater than or equal to 0; then, the first party or the third party performs multi-party joint computation by using the two updated local fragments together with the fragments held by the other two parties to obtain the two overflow fragments of the overflow bit; the other two parties also separately obtain two overflow fragments of the overflow bit that are held by the two parties, where the overflow bit indicates whether the offset data are greater than or equal to the first value; finally, the first party or the third party obtains the two converted fragments based on the two updated local fragments, the two overflow fragments, and the offset; and correspondingly, the second party obtains the two converted fragments based on the two local fragments and the two overflow fragments. It can be determined from the descriptions above that, in the embodiments of this specification, initially, an offset is added to the privacy data, so that the offset data are a positive number, and the privacy data can be processed into two cases: a signed integer and an unsigned integer. Subsequently, the overflow fragments of the overflow bit are obtained by performing multi-party joint computation. Based on the overflow fragments, a potential overflow is subtracted from the offset data, and impact of the initially added offset is eliminated to obtain an expected output. In the embodiments, fragment extension is implemented by directly computing the overflow bit, so that the privacy data can be protected and high efficiency can be achieved.

The method for indirectly computing w by using a random number is as follows:

Optimization is performed on online overheads by using a pre-generated random number. To process both signed and unsigned integers at the same time, an offset $2^{l-1}$ is first added to the input x. Therefore, $x'=x+2^{l-1} \in [0, 2^l-1)$, which must be a positive number. Then, the Mixed_Share sub-protocol is used to pre-construct fragments of the random number on rings of different sizes. The random number is then used to perform a mask-and-reveal operation on the secret input and subtract a potential additive overflow term. Finally, impact of the initially added offset needs to be eliminated. Therefore, the offset $2^l-1$ is subtracted from the above-mentioned result to obtain an output of fragment extension.

It can be understood that, the following equation holds true:

$$x = ((x+r) \bmod 2^m - r) \bmod 2^n$$
$$= (y + w*2^m - r) \bmod 2^n.$$

$y=(x+r) \bmod 2^m$, $w=x+r \geq 2^m$. Because $m<n$, $(w*2^m) \bmod 2^n$ is unnecessarily equal to 0, and w needs to be explicitly computed. As x is a positive number, the following equation holds true: $w=(r \geq 2^{m-1})*(y<2^{m-1})=r_{m-1} \wedge \neg y_{m-1}$. Because y is a value obtained after mask, y can be restored to a plaintext form, and therefore $y_{m-1}$ can be directly obtained. $r_{m-1}$ represents a most significant bit of the generated random number, and can also be obtained during pre-computation. Therefore, $r_{m-1}$ can be directly multiplied by $\neg y_{m-1}$ to obtain w. A result obtained by subtracting the overflow term can be computed as follows: $x=y-r+w*2^m$.

The following describes the Mixed_Share sub-protocol.

This protocol uses the random bit generation protocol RandomBit to construct m random bit fragments on $\mathbb{Z}_{2^n}$, and obtain fragments of an m-bit random number on $\mathbb{Z}_{2^n}$ by computing $$r = \sum_{i=0}^{m-1} 2^i * r_i.$$

Then, a fragment reduction protocol is invoked to convert the above-mentioned random number fragments on $\mathbb{Z}_{2^n}$ into fragments on $\mathbb{Z}_{2^m}$. In this step, no overheads are needed. Finally, the fragments of r on the two rings and a fragment of a most significant bit of r on $\mathbb{Z}_{2^n}$ are output.

FIG. 4 is a flowchart illustrating a secure-fragment-conversion method for protecting privacy data, according to some other embodiments. Based on the implementation scenario shown in FIG. 1, the method can implement secure fragment conversion by indirectly computing the overflow bit w by using a random number. The privacy data are split into a first fragment, a second fragment, and a third fragment in a first ring for performing a modulo operation on a first value, and the first value is 2 to the power of m; and a first party holds the first fragment and the second fragment, a second party holds the second fragment and the third fragment, a third party holds the third fragment and the first fragment, and the method is performed by the first party or the third party. As shown in FIG. 4, the secure-fragment-conversion method for protecting privacy data in the embodiments includes the following steps: Step 41: Update, by adding an offset to the first fragment, the two local fragments held by the local party, where the offset enables offset data obtained by performing addition on updated fragments of each party to be greater than or equal to 0. Step 42: Obtain two groups of random fragments of a random number that correspond to the local party and two significant-bit fragments of a most significant bit of the random number and in a second ring for performing a modulo operation on a second value, where the second value is 2 to the power of n, and m is less than n. Step 43: Perform multi-party joint computation with the other two parties by using the two updated local fragments, the two groups of random fragments, and the two significant-bit fragments to obtain two overflow fragments of an overflow bit and in the second ring, where the overflow bit is used to indicate whether a sum of the offset data and the random number is greater than or equal to the first value. Step 44: Obtain two converted fragments in the second ring based on the two overflow fragments, the two groups of random fragments, and the offset. The following describes specific execution methods of the above-mentioned steps.

First, in step 41, the two local fragments held by the local party are updated by adding the offset to the first fragment, where the offset enables the offset data obtained by performing addition on the updated fragments of each party to be greater than or equal to 0. It can be understood that, the privacy data are split into the first fragment, the second fragment, and the third fragment in the first ring for performing a modulo operation on the first value, and adding the offset to the first fragment is adding the offset to the privacy data.

It can be understood that both the first party and the third party have the first fragment, and perform consistent operations on the first fragment.

In a possible implementation, a lower limit of a value range of the privacy data is 2 to the negative power of (l−1), an upper limit of the value range of the privacy data is 2 to the power of (l−1) minus 1, and l is less than m; and the offset is 2 to the power of (l−1).

For example, the fragments of the privacy data in the first ring are denoted as $[\![x]\!]_m = (x_0, x_1, x_2)$, where $x_0$ represents the first fragment, $x_1$ represents the second fragment, and $x_2$ represents the third fragment. An offset $2^{l-1}$ is added to obtain fragments of the offset data in the first ring, and the fragments are denoted as $[\![x']\!]_m = (x_0 + 2^{l-1}, x_1, x_2)$.

Then, in step 42, the two groups of random fragments of the random number that correspond to the local party and the two significant-bit fragments of the most significant bit of the random number and in the second ring for performing a modulo operation on the second value are obtained, where the second value is 2 to the power of n, and m is less than n. It can be understood that, the random number can be pre-generated, and the two groups of random fragments can be fragments of the random number on rings of different sizes.

In an example, the two groups of random fragments include two first random fragments of the random number and in the first ring and two second random fragments of the random number and in the second ring.

For example, the random number is r, the first random fragment is denoted as $[\![r]\!]_m$, the second random fragment is denoted as $[\![r]\!]_n$, r falls within an interval of $[0, 2^m)$, and the significant-bit fragment is denoted as $[\![r_{m-1}]\!]_n$.

Further, the two first random fragments, the two second random fragments, and the two significant-bit fragments are pre-generated in the following way: two random bit fragments of each of m bits are generated in the second ring by performing multi-party joint sub-computation with the other two parties, where the m bits correspond to bits of the random number; the two second random fragments of the random number and in the second ring are locally computed based on random bit fragments held by the local party; and the two first random fragments are obtained by local computation based on the two second random fragments of the random number that are held by the local party.

In the embodiments of this specification, the random number can be pre-generated by invoking the Mixed_Share sub-protocol. For example, a random bit fragment $[\![r_i]\!]_n$ is first generated, and $r_i \in \{0, 1\}$, $i \in [0, m-1]$. Then, Pi locally computes $[\![r]\!]_n = \sum_{i=0}^{m-1} 2^i * [\![r_i]\!]_n$, where $i \in \{0, 1, 2\}$. Finally, $[\![r]\!]_n$ is converted into $[\![r]\!]_m$ by invoking a fragment reduction protocol.

Further, that the two first random fragments are obtained by local computation includes the following: a modulo operation on the first value is separately performed for the two second random fragments of the random number that are held by the local party to obtain the two first random fragments.

For example, any one of the three parties can be represented as Pi, $i \in [0, 2]$, and a fragment held by Pi is denoted as $(x_i, x_{i+1})$. Pi locally computes $x_i' = x_i \bmod 2^m$ and $x_{i+1}' = x_{i+1} \bmod 2^m$, so that $(x_0 + x_1 + x_2) \bmod 2^n = (x_0' + x_1' + x_2') \bmod 2^m$.

Next, in step 43, multi-party joint computation is performed with the other two parties by using the two updated local fragments, the two groups of random fragments, and the two significant-bit fragments to obtain the two overflow fragments of the overflow bit and in the second ring, where the overflow bit is used to indicate whether a sum of the offset data and the random number is greater than or equal to the first value. It can be understood that, data masked by using a random number can be disclosed to each party.

In an example, the two groups of random fragments include two first random fragments of the random number and in the first ring and two second random fragments of the random number and in the second ring; and the obtaining two overflow fragments of an overflow bit and in the second ring includes the following: first joint computation is performed with the other two parties by using the two updated local fragments and the two first random fragments to obtain obfuscated data; and the two overflow fragments are locally computed based on a most significant bit of the obfuscated data and the two significant-bit fragments.

For example, the local fragment is represented as $[x]_{m}$, the first random fragment is represented as $[r]_{m}$, the obfuscated data are $y=x+r$, the significant-bit fragment is represented as $[r_{m-1}]_{n}$, and the most significant bit of the obfuscated data is represented as $y_{m-1}$.

Further, the first joint computation includes the following: a corresponding sum of the two updated local fragments and the two first random fragments is locally computed to obtain two local obfuscated fragments; an interactive obfuscated fragment other than the two local obfuscated fragments is received from either of the other two parties; and local summation is performed on the two local obfuscated fragments and the interactive obfuscated fragment to obtain the obfuscated data.

For example, two local obfuscated fragments obtained by the first party are represented as $y_0$ and $y_1$, two local obfuscated fragments obtained by the second party are represented as $y_1$ and $y_2$, and two local obfuscated fragments obtained by the third party are represented as $y_2$ and $y_0$. The first party obtains the interactive obfuscated fragment $y_2$ from the second party or the third party, and sums up $y_0$, $y_1$, and $y_2$ to obtain the obfuscated data y.

Finally, in step 44, the two converted fragments in the second ring are obtained based on the two overflow fragments, the two groups of random fragments, and the offset. It can be understood that, on the basis of the offset data, a potential overflow is subtracted, and then impact of the initially added offset is eliminated to obtain an expected output.

In an example, the two groups of random fragments include two first random fragments of the random number and in the first ring and two second random fragments of the random number and in the second ring; and the obtaining two overflow fragments of an overflow bit and in the second ring includes the following: first joint computation is performed with the other two parties by using the two updated local fragments and the two first random fragments to obtain obfuscated data; and the two overflow fragments are locally computed based on a most significant bit of the obfuscated data and the two significant-bit fragments.

Further, that two converted fragments in the second ring are obtained includes the following: two intermediate fragments are locally computed based on the obfuscated data, the two second random fragments, and the two overflow fragments; and the offset is subtracted from an intermediate fragment corresponding to the first fragment to obtain a converted fragment of the intermediate fragment and in the second ring; and the other intermediate fragment is used as the other converted fragment.

For example, the obfuscated data are y, the second random fragment is $[r]_{n}$, the overflow fragment is $[w]_{n}$, and the intermediate fragment is a $[x]_{n}=y-[r]_{n}+[w]_{n}*2^{m}$. Both the first party and the third party have intermediate fragments corresponding to the first fragment. The offset can be subtracted from the intermediate fragment to obtain the converted fragment of the intermediate fragment and in the second ring.

FIG. 5 is a flowchart illustrating a secure-fragment-conversion method for protecting privacy data, according to some other embodiments. Based on the implementation scenario shown in FIG. 1, the method can implement secure fragment conversion by indirectly computing the overflow bit w by using a random number. The privacy data are split into a first fragment, a second fragment, and a third fragment in a first ring for performing a modulo operation on a first value, and the first value is 2 to the power of m; and a first party holds the first fragment and the second fragment, a second party holds the second fragment and the third fragment, a third party holds the third fragment and the first fragment, and the method is performed by the second party. As shown in FIG. 5, the secure-fragment-conversion method for protecting privacy data in the embodiments includes the following steps: Step 51: Obtain two groups of random fragments of a random number that correspond to the local party and two significant-bit fragments of a most significant bit of the random number and in a second ring for performing a modulo operation on a second value, where the second value is 2 to the power of n, and m is less than n. Step 52: Perform multi-party joint computation by using the two fragments held by the local party, the two groups of random fragments, the two significant-bit fragments, and updated fragments of the other two parties to obtain two overflow fragments of an overflow bit and in the second ring, where the updated fragments of the other two parties are obtained by adding an offset to the first fragment, and the offset enables offset data obtained by performing addition on the updated fragments of each party to be greater than or equal to 0; and the overflow bit is used to indicate whether a sum of the offset data and the random number is greater than or equal to the first value. Step 53: Obtain two converted fragments in the second ring based on the two overflow fragments and the two groups of random fragments. The following describes specific execution methods of the above-mentioned steps.

First, in step 51, the two groups of random fragments of the random number that correspond to the local party and the two significant-bit fragments of the most significant bit of the random number and in the second ring for performing a modulo operation on the second value are obtained, where the second value is 2 to the power of n, and m is less than n. It can be understood that, the random number can be pre-generated, and the two groups of random fragments can be fragments of the random number on rings of different sizes.

In an example, the two groups of random fragments include two first random fragments of the random number and in the first ring and two second random fragments of the random number and in the second ring.

For example, the random number is r, the first random fragment is denoted as $[r]_{m}$, the second random fragment is denoted as $[r]_{n}$, r falls within an interval of $[0, 2^{m})$, and the significant-bit fragment is denoted as $[r_{m-1}]_{n}$.

In the embodiments of this specification, a generation method of the random number has been described in the embodiments shown in FIG. 4, and details are omitted here for simplicity.

Then, in step 52, multi-party joint computation is performed by using the two fragments held by the local party, the two groups of random fragments, the two significant-bit fragments, and the updated fragments of the other two parties to obtain the two overflow fragments of the overflow bit and in the second ring, where the updated fragments of the other two parties are obtained by adding the offset to the first fragment, and the offset enables the offset data obtained by performing addition on the updated fragments of each party to be greater than or equal to 0; and the overflow bit is used to indicate whether the sum of the offset data and the random number is greater than or equal to the first value. It can be understood that, data masked by using a random number can be disclosed to each party.

In an example, the two groups of random fragments include two first random fragments of the random number and in the first ring and two second random fragments of the random number and in the second ring; and the obtaining two overflow fragments of an overflow bit and in the second ring includes the following: first joint computation is performed with the other two parties by using the two fragments held by the local party and the two first random fragments to obtain obfuscated data; and the two overflow fragments are locally computed based on a most significant bit of the obfuscated data and the two significant-bit fragments.

For example, the local fragment is represented as $[\![x]\!]_m$, the first random fragment is represented as $[\![r]\!]_m$, the obfuscated data are $y=x+r$, the significant-bit fragment is represented as $[\![r_{m-1}]\!]_n$, and the most significant bit of the obfuscated data is represented as $y_{m-1}$. It can be understood that, the two fragments held by the local party are the second fragment and the third fragment. Because the offset is added to the first fragment, the fragments held by the second party are not affected by the offset.

Finally, in step 53, the two converted fragments in the second ring are obtained based on the two overflow fragments and the two groups of random fragments. It can be understood that, the two local fragments held by the second party are not affected by the offset, and on the basis of the offset data, a potential overflow is subtracted to obtain an expected output.

In an example, that two converted fragments in the second ring are obtained includes the following: the two converted fragments are locally computed based on the obfuscated data, the two second random fragments, and the two overflow fragments.

For example, the obfuscated data are y, the second random fragment is $[\![r]\!]_n$, the overflow fragment is $[\![w]\!]_n$, and the converted fragment is $[\![x]\!]_n = y - [\![r]\!]_n + [\![w]\!]_n * 2^m$.

According to the method provided in the embodiments of this specification, the method is used to implement fragment extension from a small ring to a large ring. First, based on the three-party replicated secret sharing scenario, the first party or the third party updates the two local fragments held by the local party by adding the offset to the first fragment, where the offset enables the offset data obtained by performing addition on the updated fragments of each party to be greater than or equal to 0; then, each party obtains two groups of random fragments of the random number that correspond to the local party and the two significant-bit fragments of the most significant bit of the random number; subsequently, the first party or the third party performs multi-party joint computation by using the two updated local fragments, the two groups of random fragments, and the two significant-bit fragments to obtain the two overflow fragments of the overflow bit; the other two parties also separately obtain two overflow fragments of the overflow bit that are held by the two parties, where the overflow bit is used to indicate whether the sum of the offset data and the random number is greater than or equal to the first value; finally, the first party or the third party obtains the two converted fragments based on the two overflow fragments, the two groups of random fragments, and the offset; and correspondingly, the second party obtains the two converted fragments based on the two overflow fragments and the two groups of random fragments. It can be determined from the descriptions above that, in the embodiments of this specification, initially, an offset is added to the privacy data, so that the offset data are a positive number, and the privacy data can be processed into two cases: a signed integer and an unsigned integer. Subsequently, the overflow fragments of the overflow bit are obtained by performing multi-party joint computation. The multi-party joint computation masks the offset data by using the random number. Based on the overflow fragments, a potential overflow is subtracted from the offset data, and impact of the initially added offset is eliminated to obtain an expected output. In the embodiments, fragment extension is implemented by indirectly computing the overflow bit by using the random number, and the random number can be generated in a pre-computation phase, so that overheads in an online phase can be reduced, the privacy data can be protected, and high efficiency can be achieved.

The following briefly describes conventional computation primitives used in the embodiments of this specification, including:

An addition operation and a constant multiplication operation can be directly completed based on an original additive secret sharing protocol. Each participant only needs to perform computation locally.

With respect to multiplication operations, one fixed-point number multiplication operation includes two key computations: First, a participant performs an integer multiplication operation by using a standard multiplication protocol. After the multiplication computation is completed, because fixed-point number data have limited precision, a truncation operation further needs to be performed on a computation result. Data obtained after the precision is doubled are truncated by using a truncation protocol (the last f bits of the data are truncated), i.e., the data are divided by $2^f$.

A comparison operation uses an MSB protocol to determine whether a most significant bit of an input is 0 or 1, so as to determine whether the input is positive or negative.

A Boolean operation uses AND and XOR protocols to respectively compute AND and XOR operations on a binary input.

An arithmetic-Boolean conversion operation uses a B2A protocol to convert Boolean sharing of a number into arithmetic sharing.

Random bit generation employs the RandomBit protocol to obtain fragments of a random bit $b \in \{0, 1\}$ on a ring.

The secret sharing-based secure-fragment-conversion method proposed in the embodiments of this specification can securely and correctly complete mutual conversion of fragments on rings of different sizes, can largely reduce a communication amount compared with conventional solutions, and can complete computation in a constant quantity of communication rounds, thereby achieving higher efficiency in actual application scenarios and implementing order-of-magnitude efficiency improvement compared with conventional solutions. The secret sharing-based securefragment-conversion method proposed in the embodiments of this specification can be applied to different computation scenarios as an underlying protocol, so as to dynamically adjust ring sizes for different sub-computations and optimize efficiency.

According to some embodiments of another aspect, a secure-fragment-conversion apparatus for protecting privacy data is further provided. The apparatus is configured to perform methods for implementing fragment reduction provided in embodiments of this specification. The privacy data are split into a first fragment, a second fragment, and a third fragment in a first ring for performing a modulo operation on a first value, and the first value is 2 to the power of n; and a first party holds the first fragment and the second fragment, a second party holds the second fragment and the third fragment, a third party holds the third fragment and the first fragment, and the apparatus is disposed in any one of the first party, the second party, and the third party and includes the following: a modulo unit, configured to perform a modulo operation on a second value for the two local fragments held by the local party to obtain two converted fragments of the privacy data and in a second ring for performing a modulo operation on the second value, where the second value is 2 to the power of m, and m is less than n.

Figure 6:
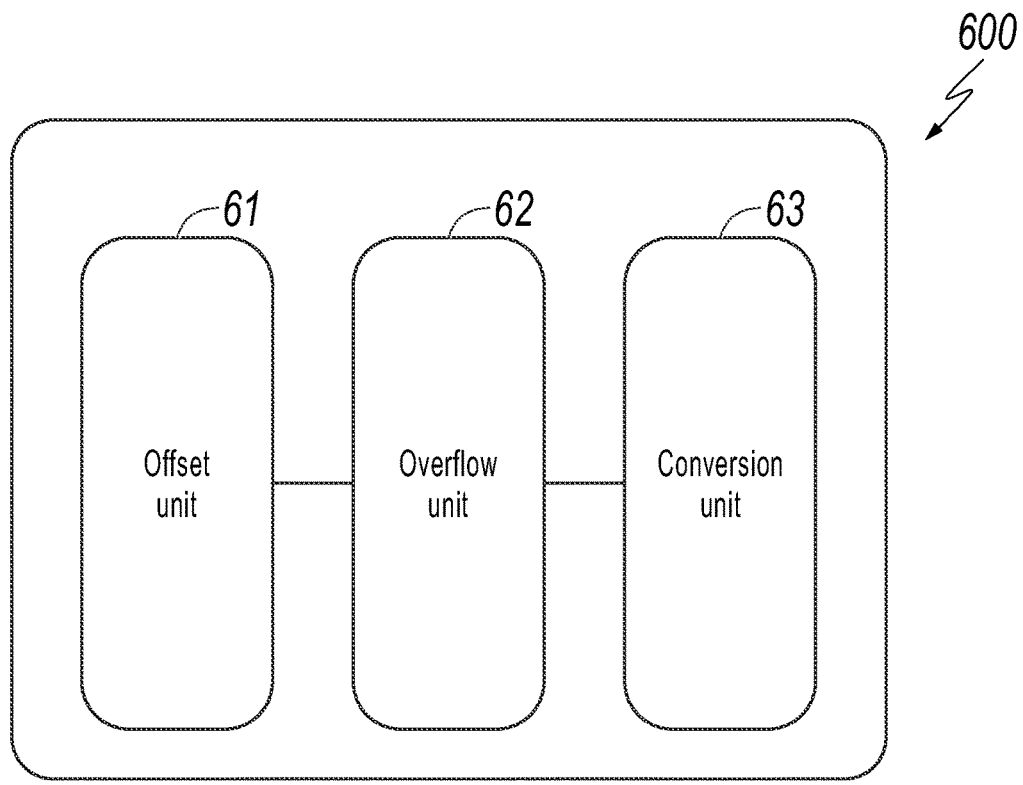
FIG. 6 is a schematic block diagram illustrating a secure-fragment-conversion apparatus for protecting privacy data, according to some embodiments.

According to some embodiments of another aspect, a secure-fragment-conversion apparatus for protecting privacy data is further provided. The apparatus is configured to perform the method provided in the embodiments shown in FIG. 2 of this specification. The privacy data are split into a first fragment, a second fragment, and a third fragment in a first ring for performing a modulo operation on a first value, and the first value is 2 to the power of m; and a first party holds the first fragment and the second fragment, a second party holds the second fragment and the third fragment, a third party holds the third fragment and the first fragment, and the apparatus is disposed in the first party or the third party. FIG. 6 is a schematic block diagram illustrating a secure-fragment-conversion apparatus for protecting privacy data, according to some embodiments. As shown in FIG. 6, the apparatus 600 includes the following: an offset unit 61, configured to update, by adding an offset to the first fragment, the two local fragments held by the local party, where the offset enables offset data obtained by performing addition on updated fragments of each party to be greater than or equal to 0; an overflow unit 62, configured to perform multi-party joint computation by using the two updated local fragments obtained by the offset unit 61 together with the fragments held by the other two parties to obtain two overflow fragments of an overflow bit and in a second ring for performing a modulo operation on a second value, where the second value is 2 to the power of n, and m is less than n; and the overflow bit indicates whether the offset data are greater than or equal to the first value; and a conversion unit 63, configured to obtain two converted fragments in the second ring based on the two updated local fragments obtained by the offset unit 61, the two overflow fragments obtained by the overflow unit 62, and the offset.

Figure 7:
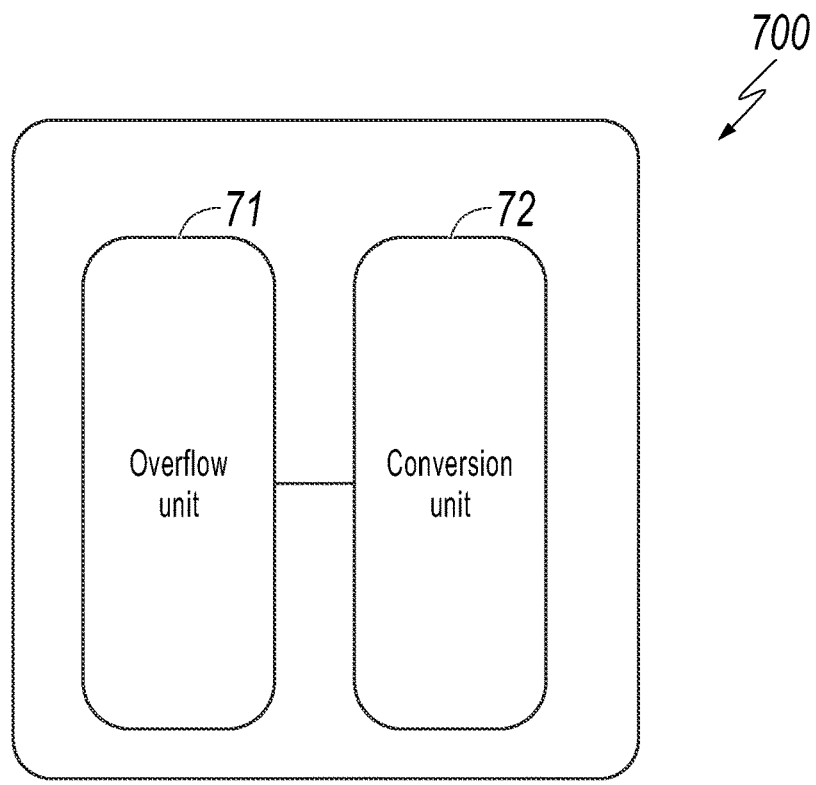
FIG. 7 is a schematic block diagram illustrating a secure-fragment-conversion apparatus for protecting privacy data, according to some other embodiments.

According to some embodiments of another aspect, a secure-fragment-conversion apparatus for protecting privacy data is further provided. The apparatus is configured to perform the method provided in the embodiments shown in FIG. 3 of this specification. The privacy data are split into a first fragment, a second fragment, and a third fragment in a first ring for performing a modulo operation on a first value, and the first value is 2 to the power of m; and a first party holds the first fragment and the second fragment, a second party holds the second fragment and the third fragment, a third party holds the third fragment and the first fragment, and the apparatus is disposed in the second party. FIG. 7 is a schematic block diagram illustrating a secure-fragment-conversion apparatus for protecting privacy data, according to some other embodiments. As shown in FIG. 7, the apparatus 700 includes the following: an overflow unit 71, configured to perform multi-party joint computation by using the two fragments held by the local party and updated fragments of the other two parties to obtain two overflow fragments of an overflow bit and in a second ring for performing a modulo operation on a second value, where the second value is 2 to the power of n, and m is less than n; the updated fragments of the other two parties are obtained by adding an offset to the first fragment, and the offset enables offset data obtained by performing addition on the updated fragments of each party to be greater than or equal to 0; and the overflow bit indicates whether the offset data are greater than or equal to the first value; and a conversion unit 72, configured to obtain two converted fragments in the second ring based on the two local fragments and the two overflow fragments obtained by the overflow unit 71.

Figure 8:
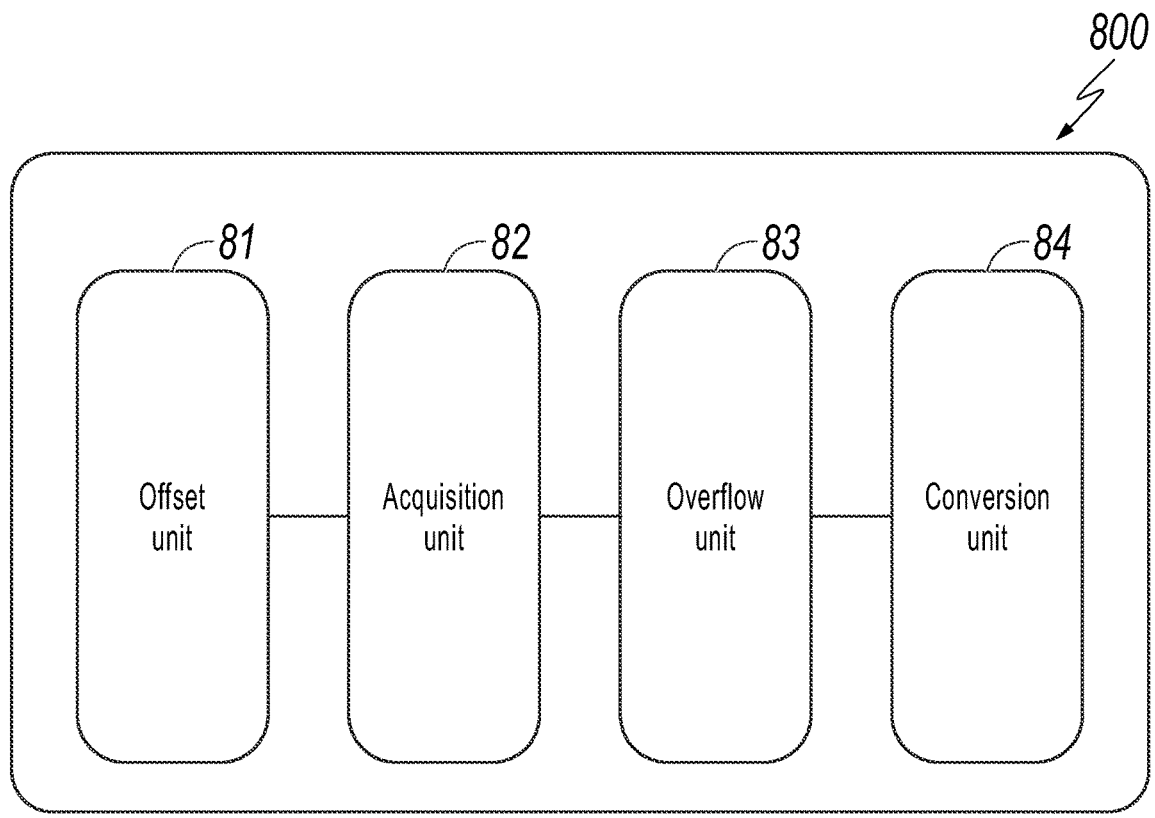
FIG. 8 is a schematic block diagram illustrating a secure-fragment-conversion apparatus for protecting privacy data, according to some other embodiments.

According to some embodiments of another aspect, a secure-fragment-conversion apparatus for protecting privacy data is further provided. The apparatus is configured to perform the method provided in the embodiments shown in FIG. 4 of this specification. The privacy data are split into a first fragment, a second fragment, and a third fragment in a first ring for performing a modulo operation on a first value, and the first value is 2 to the power of m; and a first party holds the first fragment and the second fragment, a second party holds the second fragment and the third fragment, a third party holds the third fragment and the first fragment, and the apparatus is disposed in the first party or the third party. FIG. 8 is a schematic block diagram illustrating a secure-fragment-conversion apparatus for protecting privacy data, according to some other embodiments. As shown in FIG. 8, the apparatus 800 includes the following: an offset unit 81, configured to update, by adding an offset to the first fragment, the two local fragments held by the local party, where the offset enables offset data obtained by performing addition on updated fragments of each party to be greater than or equal to 0; an acquisition unit 82, configured to obtain two groups of random fragments of a random number that correspond to the local party and two significant-bit fragments of a most significant bit of the random number and in a second ring for performing a modulo operation on a second value, where the second value is 2 to the power of n, and m is less than n; an overflow unit 83, configured to perform multi-party joint computation with the other two parties by using the two updated local fragments obtained by the offset unit 81 and the two groups of random fragments and the two significant-bit fragments obtained by the acquisition unit 82 to obtain two overflow fragments of an overflow bit and in the second ring, where the overflow bit is used to indicate whether a sum of the offset data and the random number is greater than or equal to the first value; and a conversion unit 84, configured to obtain two converted fragments in the second ring based on the two overflow fragments obtained by the overflow unit 83, the two groups of random fragments obtained by the acquisition unit 82, and the offset.

Figure 9:
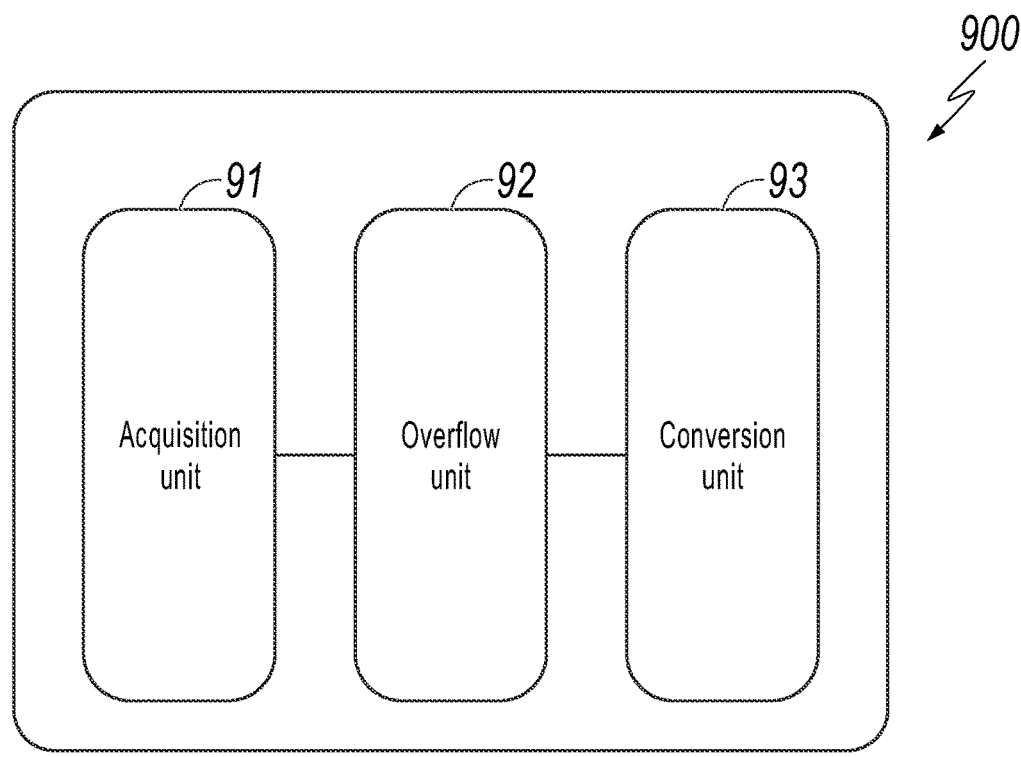
FIG. 9 is a schematic block diagram illustrating a secure-fragment-conversion apparatus for protecting privacy data, according to some embodiments.

According to some embodiments of another aspect, a secure-fragment-conversion apparatus for protecting privacy data is further provided. The apparatus is configured to perform the method provided in the embodiments shown in FIG. 5 of this specification. The privacy data are split into a first fragment, a second fragment, and a third fragment in a first ring for performing a modulo operation on a first value, and the first value is 2 to the power of m; and a first party holds the first fragment and the second fragment, a second party holds the second fragment and the third fragment, a third party holds the third fragment and the first fragment, and the apparatus is disposed in the second party. FIG. 9 is a schematic block diagram illustrating a secure-fragment-conversion apparatus for protecting privacy data, according to some other embodiments. As shown in FIG. 9, the apparatus 900 includes the following: an acquisition unit 91, configured to obtain two groups of random fragments of a random number that correspond to the local party and two significant-bit fragments of a most significant bit of the random number and in a second ring for performing a modulo operation on a second value, where the second value is 2 to the power of n, and m is less than n; an overflow unit 92, configured to perform multi-party joint computation by using the two fragments held by the local party, the two groups of random fragments and the two significant-bit fragments obtained by the acquisition unit 91, and updated fragments of the other two parties to obtain two overflow fragments of an overflow bit and in the second ring, where the updated fragments of the other two parties are obtained by adding an offset to the first fragment, and the offset enables offset data obtained by performing addition on the updated fragments of each party to be greater than or equal to 0; and the overflow bit is used to indicate whether a sum of the offset data and the random number is greater than or equal to the first value; and a conversion unit 93, configured to obtain two converted fragments in the second ring based on the two overflow fragments obtained by the overflow unit 92 and the two groups of random fragments obtained by the acquisition unit 91.

According to some embodiments of another aspect, a computer-readable storage medium is further provided, where a computer program is stored in the computer-readable storage medium, and when the computer program is executed in a computer, the computer is enabled to perform the method described with reference to any one of FIG. 2 to FIG. 5.

According to some embodiments of still another aspect, a computing device is further provided, including a memory and a processor. Executable code is stored in the memory, and when executing the executable code, the processor implements the method described with reference to any one of FIG. 2 to FIG. 5.

A person skilled in the art should be aware that in the above-mentioned one or more examples, functions described in this specification can be implemented by hardware, software, firmware, or any combination thereof. When implemented by using software, these functions can be stored in a computer-readable medium or transmitted as one or more instructions or one or more pieces of code on a computer-readable medium.

The above-mentioned specific implementations further describe in detail the objectives, technical solutions, and beneficial effects of this specification. It should be understood that the descriptions above are merely specific implementations of this specification and are not intended to limit the protection scope of this specification. Any modifications, equivalent replacements, or improvements made on the basis of the technical solutions of this specification shall fall within the protection scope of this specification.

What is claimed is:

1. A computer-implemented method for secure-fragment-conversion privacy data protection, comprising:
performing by a first party or a third party:
updating, by adding an offset to a first fragment and as an updated first fragment, two local fragments held by a local party as two updated local fragments, wherein privacy data is split into a first fragment, a second fragment, and a third fragment in a first ring for performing a modulo operation on a first value, wherein the first value is an m power of 2, wherein the first party holds the first fragment and the second fragment, wherein a second party holds the second fragment and the third fragment, wherein the third party holds the third fragment and the first fragment, and wherein the offset enables offset data obtained by performing addition on updated fragments of each party to be greater than or equal to 0;
performing multi-party joint computation by using the two updated local fragments together with fragments held by the other two parties to obtain two overflow fragments of an overflow bit and in a second ring for performing a modulo operation on a second value, wherein the second value is an n power of 2, and m is less than n; and the overflow bit indicates whether the offset data is greater than or equal to the first value; and
obtaining two converted fragments in the second ring based on the two updated local fragments, the two overflow fragments, and the offset.

2. The computer-implemented method of claim 1, wherein obtaining two converted fragments in the second ring, comprises:
performing an operation in the second ring for each updated local fragment based on a product of a corresponding overflow fragment and the first value to obtain a corresponding intermediate fragment; and
subtracting the offset from an intermediate fragment corresponding to the first fragment to obtain a converted fragment of the intermediate fragment and in the second ring; and using the other intermediate fragment as the other converted fragment.

3. The computer-implemented method of claim 1, wherein the multi-party joint computation comprises:
locally constructing two first Boolean fragments of a first most significant bit of the updated first fragment;
receiving two second Boolean fragments of a second most significant bit from the second party, wherein the second most significant bit corresponds to a most significant bit of first converted data obtained by a sum of the second fragment and the third fragment mod the first value;
performing first multi-party joint sub-computation with the other two parties by using the two first Boolean fragments and the two second Boolean fragments to obtain two third Boolean fragments of a first overflow bit, wherein the first overflow bit indicates whether a sum of the first converted data and the updated first fragment is greater than or equal to the first value;
performing second multi-party joint sub-computation with the other two parties by using the two third Boolean fragments to obtain two first overflow fragments of the first overflow bit and in the second ring; and
performing local computation based on the two first overflow fragments to obtain the two overflow fragments.

4. The computer-implemented method of claim 3, wherein the multi-party joint computation comprises:
receiving two second overflow fragments of a second overflow bit and in the second ring from the second party, wherein the second overflow bit indicates whether the sum of the second fragment and the third fragment is greater than or equal to the first value; and performing local computation based on the two first overflow fragments to obtain the two overflow fragments, comprises:

performing local summation on the first overflow fragment and the second overflow fragment to obtain one overflow fragment in the two overflow fragments.

5. A non-transitory, computer-readable medium storing one or more instructions executable by a computer system to perform one or more operations for secure-fragment-conversion privacy data protection, comprising:

performing by a first party or a third party:

updating, by adding an offset to a first fragment and as an updated first fragment, two local fragments held by a local party as two updated local fragments, wherein privacy data is split into a first fragment, a second fragment, and a third fragment in a first ring for performing a modulo operation on a first value, wherein the first value is an m power of 2, wherein the first party holds the first fragment and the second fragment, wherein a second party holds the second fragment and the third fragment, wherein the third party holds the third fragment and the first fragment, and wherein the offset enables offset data obtained by performing addition on updated fragments of each party to be greater than or equal to 0;

performing multi-party joint computation by using the two updated local fragments together with fragments held by the other two parties to obtain two overflow fragments of an overflow bit and in a second ring for performing a modulo operation on a second value, wherein the second value is an n power of 2, and m is less than n; and the overflow bit indicates whether the offset data is greater than or equal to the first value; and obtaining two converted fragments in the second ring based on the two updated local fragments, the two overflow fragments, and the offset.

6. The non-transitory, computer-readable medium of claim 5, wherein obtaining two converted fragments in the second ring, comprises:

performing an operation in the second ring for each updated local fragment based on a product of a corresponding overflow fragment and the first value to obtain a corresponding intermediate fragment; and subtracting the offset from an intermediate fragment corresponding to the first fragment to obtain a converted fragment of the intermediate fragment and in the second ring; and using the other intermediate fragment as the other converted fragment.

7. The non-transitory, computer-readable medium of claim 5, wherein the multi-party joint computation comprises:

locally constructing two first Boolean fragments of a first most significant bit of the updated first fragment;

receiving two second Boolean fragments of a second most significant bit from the second party, wherein the second most significant bit corresponds to a most significant bit of first converted data obtained by a sum of the second fragment and the third fragment mod the first value;

performing first multi-party joint sub-computation with the other two parties by using the two first Boolean fragments and the two second Boolean fragments to obtain two third Boolean fragments of a first overflow bit, wherein the first overflow bit indicates whether a sum of the first converted data and the updated first fragment is greater than or equal to the first value;

performing second multi-party joint sub-computation with the other two parties by using the two third Boolean fragments to obtain two first overflow fragments of the first overflow bit and in the second ring; and performing local computation based on the two first overflow fragments to obtain the two overflow fragments.

8. The non-transitory, computer-readable medium of claim 7, wherein the multi-party joint computation comprises:

receiving two second overflow fragments of a second overflow bit and in the second ring from the second party, wherein the second overflow bit indicates whether the sum of the second fragment and the third fragment is greater than or equal to the first value; and performing local computation based on the two first overflow fragments to obtain the two overflow fragments, comprises:

performing local summation on the first overflow fragment and the second overflow fragment to obtain one overflow fragment in the two overflow fragments.

9. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for secure-fragment-conversion privacy data protection, comprising:

performing by a first party or a third party:

updating, by adding an offset to a first fragment and as an updated first fragment, two local fragments held by a local party as two updated local fragments, wherein privacy data is split into a first fragment, a second fragment, and a third fragment in a first ring for performing a modulo operation on a first value, wherein the first value is an m power of 2, wherein the first party holds the first fragment and the second fragment, wherein a second party holds the second fragment and the third fragment, wherein the third party holds the third fragment and the first fragment, and wherein the offset enables offset data obtained by performing addition on updated fragments of each party to be greater than or equal to 0;

performing multi-party joint computation by using the two updated local fragments together with fragments held by the other two parties to obtain two overflow fragments of an overflow bit and in a second ring for performing a modulo operation on a second value, wherein the second value is an n power of 2, and m is less than n; and the overflow bit indicates whether the offset data is greater than or equal to the first value; and obtaining two converted fragments in the second ring based on the two updated local fragments, the two overflow fragments, and the offset.

10. The computer-implemented system of claim 9, wherein obtaining two converted fragments in the second ring, comprises:

performing an operation in the second ring for each updated local fragment based on a product of a corresponding overflow fragment and the first value to obtain a corresponding intermediate fragment; and subtracting the offset from an intermediate fragment corresponding to the first fragment to obtain a converted fragment of the intermediate fragment and in the second ring; and using the other intermediate fragment as the other converted fragment.

11. A computer-implemented method for secure-fragment-conversion privacy data protection, comprising:
performing by a second party:
performing multi-party joint computation by using two local fragments held by a local party and updated fragments of the other two parties to obtain two overflow fragments of an overflow bit and in a second ring for performing a modulo operation on a second value, wherein privacy data is split into a first fragment, a second fragment, and a third fragment in a first ring for performing a modulo operation on a first value, wherein the first value is an m power of 2, wherein a first party holds the first fragment and the second fragment, wherein the second party holds the second fragment and the third fragment, and wherein a third party holds the third fragment and the first fragment, wherein the second value is an n power of 2, wherein m is less than n, wherein the updated fragments of the other two parties are obtained by adding an offset to the first fragment, wherein the offset enables offset data obtained by performing addition on updated fragments of each party to be greater than or equal to 0, and wherein the overflow bit indicates whether the offset data is greater than or equal to the first value; and
obtaining two converted fragments in the second ring based on the two local fragments and the two overflow fragments.

12. The computer-implemented method of claim 11, wherein obtaining two converted fragments in the second ring, comprises:
performing an operation in the second ring for each local fragment based on a product of a corresponding overflow fragment and the first value to obtain a converted fragment of the local fragment and in the second ring.

13. The computer-implemented method of claim 11, wherein the multi-party joint computation comprises:
selecting two agreed Boolean values as two locally constructed first Boolean fragments of a first most significant bit of the first fragment;
locally computing a second most significant bit, wherein the second most significant bit corresponds to a most significant bit of first converted data obtained by a sum of the second fragment and the third fragment mod the first value;
locally constructing three second Boolean fragments of the second most significant bit;
retaining two of the three second Boolean fragments;
sharing the Boolean fragments of the second most significant bit with the other two parties by using a secret sharing method;
performing first multi-party joint sub-computation with the other two parties by using the two first Boolean fragments and the two second Boolean fragments to obtain two third Boolean fragments of a first overflow bit, wherein the first overflow bit indicates whether a sum of the first converted data and an updated first fragment is greater than or equal to the first value;
performing second multi-party joint sub-computation with the other two parties by using the two third Boolean fragments to obtain two first overflow fragments of the first overflow bit and in the second ring; and
performing local computation based on the two first overflow fragments to obtain the two overflow fragments.

14. The computer-implemented method of claim 13, wherein the multi-party joint computation comprises:
locally computing a second overflow bit, wherein the second overflow bit indicates whether a sum of the second fragment and the third fragment is greater than or equal to the first value;
locally constructing three second overflow fragments of the second overflow bit and in the second ring;
retaining two of the three second overflow fragments;
sharing the overflow fragments of the second overflow bit with the other two parties by using a secret sharing method; and
performing local computation based on the two first overflow fragments to obtain the two overflow fragments comprises:
performing local summation on the first overflow fragment and the second overflow fragment to obtain one overflow fragment in the two overflow fragments.

15. A non-transitory, computer-readable medium storing one or more instructions executable by a computer system to perform one or more operations for secure-fragment-conversion privacy data protection, comprising:
performing by a second party:
performing multi-party joint computation by using two local fragments held by a local party and updated fragments of the other two parties to obtain two overflow fragments of an overflow bit and in a second ring for performing a modulo operation on a second value, wherein privacy data is split into a first fragment, a second fragment, and a third fragment in a first ring for performing a modulo operation on a first value, wherein the first value is an m power of 2, wherein a first party holds the first fragment and the second fragment, wherein the second party holds the second fragment and the third fragment, and wherein a third party holds the third fragment and the first fragment, wherein the second value is an n power of 2, wherein m is less than n, wherein the updated fragments of the other two parties are obtained by adding an offset to the first fragment, wherein the offset enables offset data obtained by performing addition on updated fragments of each party to be greater than or equal to 0, and wherein the overflow bit indicates whether the offset data is greater than or equal to the first value; and
obtaining two converted fragments in the second ring based on the two local fragments and the two overflow fragments.

16. The non-transitory, computer-readable medium of claim 15, wherein obtaining two converted fragments in the second ring, comprises:
performing an operation in the second ring for each local fragment based on a product of a corresponding overflow fragment and the first value to obtain a converted fragment of the local fragment and in the second ring.

17. The non-transitory, computer-readable medium of claim 15, wherein the multi-party joint computation comprises:
selecting two agreed Boolean values as two locally constructed first Boolean fragments of a first most significant bit of the first fragment;

locally computing a second most significant bit, wherein the second most significant bit corresponds to a most significant bit of first converted data obtained by a sum of the second fragment and the third fragment mod the first value;

locally constructing three second Boolean fragments of the second most significant bit;

retaining two of the three second Boolean fragments;

sharing the Boolean fragments of the second most significant bit with the other two parties by using a secret sharing method;

performing first multi-party joint sub-computation with the other two parties by using the two first Boolean fragments and the two second Boolean fragments to obtain two third Boolean fragments of a first overflow bit, wherein the first overflow bit indicates whether a sum of the first converted data and an updated first fragment is greater than or equal to the first value;

performing second multi-party joint sub-computation with the other two parties by using the two third Boolean fragments to obtain two first overflow fragments of the first overflow bit and in the second ring; and performing local computation based on the two first overflow fragments to obtain the two overflow fragments.

18. The non-transitory, computer-readable medium of claim 17, wherein the multi-party joint computation comprises:

locally computing a second overflow bit, wherein the second overflow bit indicates whether a sum of the second fragment and the third fragment is greater than or equal to the first value;

locally constructing three second overflow fragments of the second overflow bit and in the second ring;

retaining two of the three second overflow fragments;

sharing the overflow fragments of the second overflow bit with the other two parties by using a secret sharing method; and performing local computation based on the two first overflow fragments to obtain the two overflow fragments comprises:

performing local summation on the first overflow fragment and the second overflow fragment to obtain one overflow fragment in the two overflow fragments.

19. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for secure-fragment-conversion privacy data protection, comprising:

performing by a second party:

performing multi-party joint computation by using two local fragments held by a local party and updated fragments of the other two parties to obtain two overflow fragments of an overflow bit and in a second ring for performing a modulo operation on a second value, wherein privacy data is split into a first fragment, a second fragment, and a third fragment in a first ring for performing a modulo operation on a first value, wherein the first value is an m power of 2, wherein a first party holds the first fragment and the second fragment, wherein the second party holds the second fragment and the third fragment, and wherein a third party holds the third fragment and the first fragment, wherein the second value is an n power of 2, wherein m is less than n, wherein the updated fragments of the other two parties are obtained by adding an offset to the first fragment, wherein the offset enables offset data obtained by performing addition on updated fragments of each party to be greater than or equal to 0, and wherein the overflow bit indicates whether the offset data is greater than or equal to the first value; and obtaining two converted fragments in the second ring based on the two local fragments and the two overflow fragments.

20. The computer-implemented system of claim 19, wherein obtaining two converted fragments in the second ring, comprises:

performing an operation in the second ring for each local fragment based on a product of a corresponding overflow fragment and the first value to obtain a converted fragment of the local fragment and in the second ring.

* * * * *